US012025361B1

(12) United States Patent
Leal et al.

(10) Patent No.: US 12,025,361 B1
(45) Date of Patent: Jul. 2, 2024

(54) SYSTEMS AND METHODS FOR ARTISANAL ICE CUTTING

(71) Applicant: 2dor Gourmet Ice, LLC, Miami, FL (US)

(72) Inventors: Carlos Leal, Miami, FL (US); Diolkis Ruiz, Hollywood, FL (US)

(73) Assignee: 2dor Gourmet Ice, LLC, Miami, FL (US)

( * ) Notice: Subject to any disclaimer, the term of this patent is extended or adjusted under 35 U.S.C. 154(b) by 0 days.

(21) Appl. No.: 18/516,269

(22) Filed: Nov. 21, 2023

(51) Int. Cl.
*F25C 5/02* (2006.01)
*B44B 1/00* (2006.01)
*B44B 1/06* (2006.01)

(52) U.S. Cl.
CPC ................ *F25C 5/02* (2013.01); *B44B 1/003* (2013.01); *B44B 1/006* (2013.01); *F25C 2300/00* (2013.01)

(58) Field of Classification Search
CPC ........ F25C 5/02; F25C 2300/00; B44B 1/003; B44B 1/006
USPC .......................................................... 409/183
See application file for complete search history.

(56) References Cited

U.S. PATENT DOCUMENTS 261,810 A * 7/1882 Cook et al. ............... F25C 5/02 62/320
721,789 A * 3/1903 Duncan ................ B23D 45/102 83/508.1
754,144 A * 3/1904 Kanalz .................... B21C 47/24 414/754
766,111 A * 7/1904 Mowery ............. B23D 45/102 83/508.1
892,223 A * 6/1908 Clark ........................ F25C 5/02 62/320
990,590 A * 4/1911 Ray ........................... F25C 1/24 62/320
990,591 A * 4/1911 Ray ........................ B65H 35/08 62/298
1,102,989 A * 7/1914 Macy ........................ F25C 5/14 299/27
1,125,941 A * 1/1915 Bisek ........................ F25C 5/14 299/27
1,138,411 A * 5/1915 Pratt ...................... B28D 1/088 299/24
1,201,067 A * 10/1916 Mason ...................... B26F 1/36 83/167
(Continued)

*Primary Examiner* — Eric S Ruppert
*Assistant Examiner* — Kirstin U Oswald
(74) *Attorney, Agent, or Firm* — Stephen J. Kenny; Foley Hoag LLP

(57) ABSTRACT

A system for cutting artisanal ice including a first sliding table having defining a first direction, a first saw guide disposed above the first sliding table and perpendicular to the first direction, a first saw coupled to the first saw guide, a first pushing arm extending laterally across the first sliding table, the first pushing arm configured to translate along the first, a pivot table pivotably coupled to the first sliding table, the pivot table configured to pivot between a first coplanar position to a second downward position, a second sliding table defining a second direction, wherein the second direction is perpendicular to the first direction, a second pushing arm configured to translate along the second direction, a second saw guide disposed above the second sliding table and perpendicular to the second direction and a second saw coupled to the second saw guide.

21 Claims, 19 Drawing Sheets

(56) References Cited

U.S. PATENT DOCUMENTS

| | | | | | |
|---|---|---|---|---|---|
| 1,302,917 | A * | 5/1919 | Hairgrove | F25C 5/14 | 299/27 |
| 1,336,563 | A * | 4/1920 | Hurford | B27B 25/04 | 125/13.01 |
| 1,374,777 | A * | 4/1921 | Stoner | B27B 25/02 | 83/171 |
| 1,507,004 | A * | 9/1924 | Schraishuhn | F25C 5/14 | 125/13.01 |
| 1,620,370 | A * | 3/1927 | Maddox | B27B 5/10 | 83/749 |
| 2,080,452 | A * | 5/1937 | Zeigler | B23D 45/102 | 83/420 |
| 2,107,968 | A * | 2/1938 | Uline | F25C 5/14 | 83/272 |
| 2,113,631 | A * | 4/1938 | Smith | B23D 45/102 | 62/320 |
| 2,129,116 | A * | 9/1938 | Buffehr | B23D 45/102 | 83/435.2 |
| 2,248,296 | A * | 7/1941 | Campbell | F25C 5/14 | 62/320 |
| 2,822,004 | A * | 2/1958 | Rudolph | B26D 3/006 | 83/425.2 |
| 3,261,383 | A * | 7/1966 | Coblentz | F25C 5/14 | 83/416 |
| 3,717,115 | A * | 2/1973 | Abendroth | B63B 35/12 | 114/42 |
| 5,029,453 | A * | 7/1991 | Scherer | F25C 1/06 | 62/320 |
| 5,423,250 | A * | 6/1995 | Anderson | B26D 7/18 | 99/538 |
| 5,460,068 | A * | 10/1995 | Gwosdz | F25C 5/02 | 83/425.3 |
| 5,566,600 | A * | 10/1996 | Johnson | B26D 7/0625 | 83/77 |
| 5,784,937 | A * | 7/1998 | Wygal | B26D 9/00 | 83/932 |
| 11,692,753 | B2 | 7/2023 | Harrell | | |
| 2007/0117687 | A1* | 5/2007 | Larson | A63B 69/0062 | 482/70 |
| 2013/0340580 | A1* | 12/2013 | Strong | B26D 3/185 | 83/13 |
| 2015/0053058 | A1* | 2/2015 | Blaine | B26D 7/0625 | 83/53 |
| 2015/0205288 | A1* | 7/2015 | Strong | G05B 19/4185 | 700/114 |
| 2023/0129471 | A1* | 4/2023 | Torrenga | B26D 7/0625 | 83/13 |

* cited by examiner

SYSTEMS AND METHODS FOR ARTISANAL ICE CUTTING

FIELD OF THE DISCLOSED SUBJECT MATTER

The disclosed subject matter relates to precision manufacturing including cutting operations which maintain quality controls and structural integrity of the final product. Particularly, the present disclosed subject matter is directed to systems and methods for artisanal ice cutting.

BACKGROUND OF THE DISCLOSED SUBJECT MATTER

There is an increasing demand for large transparent ice cubes for culinary uses, e.g. making cocktails, this has several advantages over traditional molded ice in terms of taste and appearance. This market is still in the development phase with few tools or specialized equipment available, and equipment from other industries cannot be readily adapted and would result in inferior products which fail to meet the strict quality standards of artisanal ice manufacture.

Endless saws have the drawback that every cut needs to be handled by an operator in a warm (around 40° F) room to allow the action cutting ice to be softer, therefore resulting in residual melting and for that reason the final product has to be put to "dry" in pans after cutting in order to be packed without sticking to each other. In addition, the proximity of the operator's hands to the cutting area increases the risk of injury.

Other systems can only cut one size and have complicated and convoluted systems to keep the saws in place, which complicate maintenance and operation.

Other systems can use computer-numerical controlled (CNC) routers. The cutting action consumes a lot of time and ice as only one mill bit handles all cuts. The bit has to be thick in order to perform the deep cut required, and therefore would produce an undesirably thick cut that adds waste to the process. Also, after the cuts are made, the resulting ice piece has to be manually removed adding more time to the operation. Furthermore, the mill bits used are expensive due to the required length. There are other manual forms used to cut ice that will, in any case, be more time and labor consuming, and risk prone.

Therefore, there remains a need for improved and efficient systems and methods for artisanal ice cutting.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a system for cutting artisanal ice, the system including a first sliding table having a first end and a second end, defining a first direction therebetween, a first saw guide disposed above the first sliding table and oriented perpendicular to the first direction, a first saw translatably and rotatably coupled to the first saw guide, the first saw configured to translate along the first saw guide, a first pushing arm extending laterally across the first sliding table, the first pushing arm configured to translate along the first direction from the first end to the second end, a pivot table pivotably coupled to the second end of the first sliding table, the pivot table configured to pivot between a first coplanar position to a second downward position, a second sliding table having a third end and a fourth end, defining a second direction therebetween, the third end disposed adjacent to the pivot table, wherein the second direction is perpendicular to the first direction, a second pushing arm extending across the pivot table in the first direction, the second pushing arm configured to translate along the second direction from the pivot table to the fourth end of the second sliding table, a second saw guide disposed above the second sliding table and oriented perpendicular to the second direction and a second saw translatably and rotatably coupled to the second saw guide, the second saw configured to translate along the second saw guide.

The disclosed subject matter also includes a method for cutting artisanal ice, the method including providing a rectilinear ice sheet on a first sliding table, the first sliding table oriented along a first direction, advancing the at least one ice sheet in the first direction towards a pivot table, cutting at least one first cut in the ice sheet, thereby forming at least one ice rod, contacting the pivot table with the at least one ice rod, pivoting the pivot table downward with the at least one ice rod disposed thereon, thereby aligning the at least one ice rod, advancing the at least one ice rod in a second direction along a second sliding table, the second direction disposed perpendicularly to the first direction, cutting at least one transverse cut into the at least one ice rod, thereby forming at least one ice block and advancing the ice blocks in the second direction towards an endplate.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
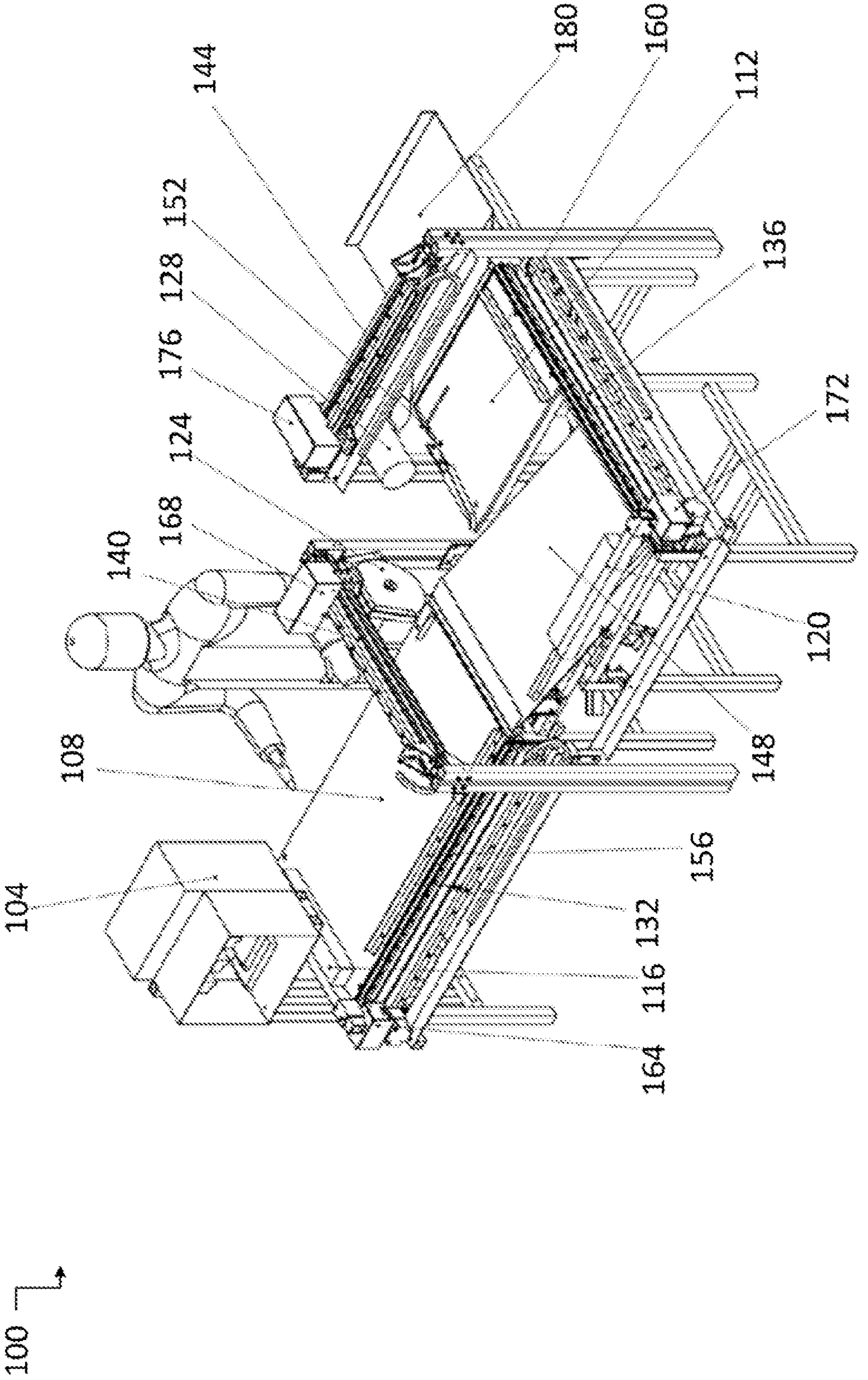
FIG. 1 is a schematic representation of a system for artisanal ice cutting in accordance with the disclosed subject matter.

The methods and systems presented herein may be used for cutting ice. The disclosed subject matter is particularly suited for artisanal ice cutting. For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

As shown in FIG. 1, a system for cutting artisanal ice 100 is shown in schematic isometric view. System 100 may include one or more adjustment mechanisms configured to allow an operator to select a desired cut dimension, ice rod dimension or ice block or cube dimension. System 100 may be a completely automated system, wherein a user initiates the operation and loads an ice sheet. In various embodiments, system 100 may be partially automated such that a user can intervene at various points in the operation and interact with various components of system, namely the ice sheet, saws, actuators, or pivot table.

System 100 may be configured to cut ice sheets into one or more elongated ice rods and further into a plurality of symmetrical ice blocks or ice cubes, depending on the selected dimension of cut input or set by the user or computer system.

Artisanal Ice Cutting Apparatus

In various embodiments, the system 100 may be configured to cut virtually any size ice block by making two cuts at an angle to one another, such as a right angle. In addition, the system 100 may be configured to perform the multiple angled cuts without snow accumulation in places that would interfere with the machine normal function or compromise the cleanliness of the ice cut, e.g. avoid snow accumulation on the ice at any "downstream" location of the manufacturing cycle. The ice can be cut while at a freezing temperature so it is ready to pack right after it comes out of the machine, and most of the ice will end up as a finished product.

In various embodiments, system 100 may include a control unit 104. Control unit 104 may include a display and interface configured to allow the user to control one or more actuators, electric motors, sensors and linear actuators. The ability to control one or more components from the control unit 104 may enhance safety and efficiency using the control box to start/stop the saw motor. On the control unit, the operator is able to set up the machine, set the desired cut dimensions and troubleshoot possible problems on the machine functions.

After desired cut program is selected, the operator may initiate the cutting operation. In various embodiments, initiating operation of system 100 may include pressing a start button, interreacting with one or more touch screens, operating a switch or the like user interaction device. After initiation, the machine may perform one or more calibration procedures, or zero one or more actuators. The system 100 may move into a starting position as shown in FIG. 1, wherein each component is in a fully retracted or storage state, as will described in detail herein below. In various embodiments, the user may manually load an ice sheet onto the first sliding table 108. In various embodiments, the system 100 may automatedly load an ice sheet onto the first sliding table 108 via a conveyor belt or robotic pick and place arm. In various embodiments, one or more sensors may detect loading of the ice sheet on the first sliding table 108 (e.g. via optical, weight, or temperature sensor) which will initiate the pushing and cut operations. In various embodiments, after ice sheet loading, the user may initiate the cut operation by another physical or computer interaction (e.g. touch screen input on control unit 104).

Figure 2:
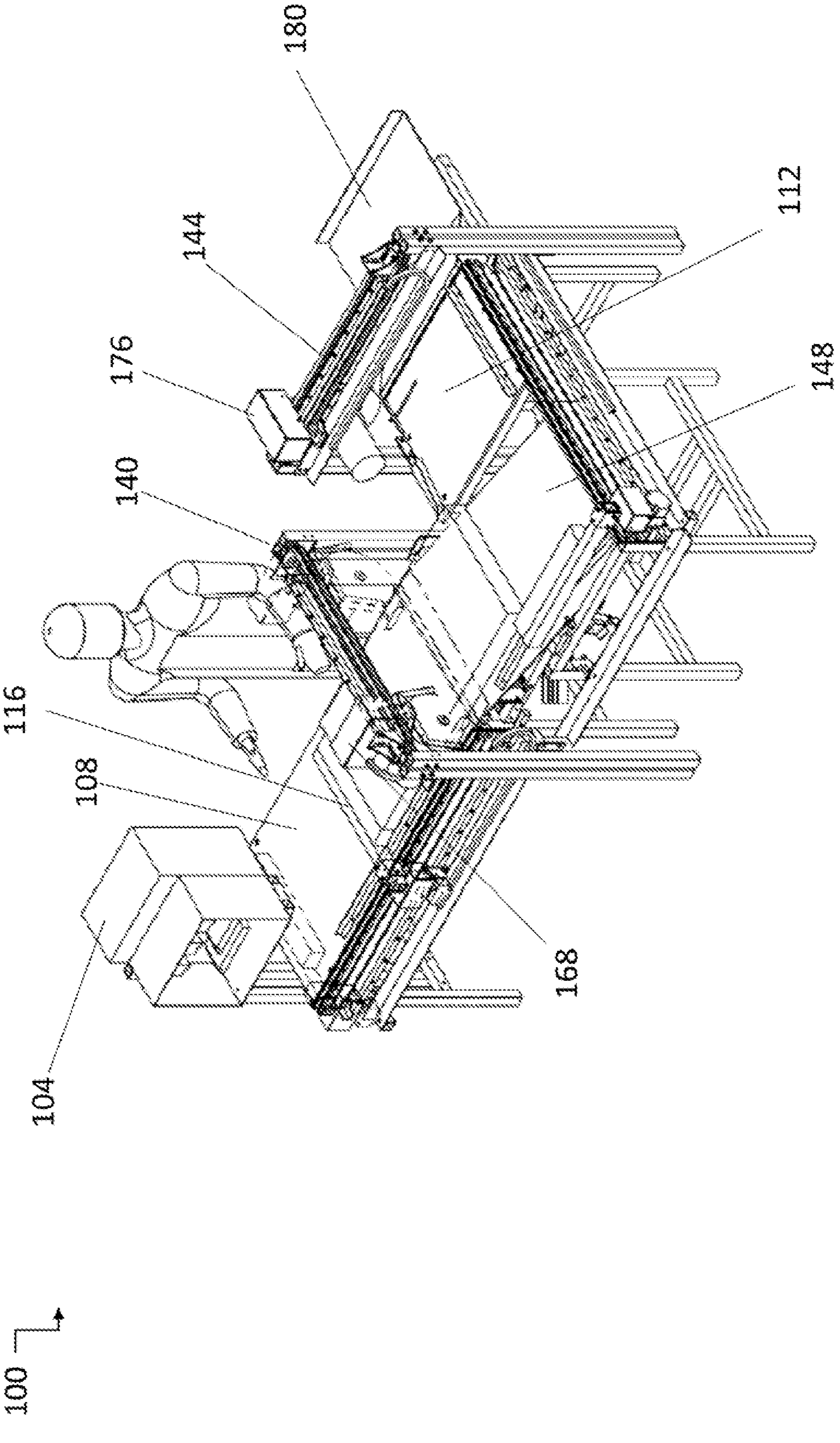
FIG. 2 is a perspective view of the system for artisanal ice cutting shown in accordance with the disclosed subject matter.
Figure 3:
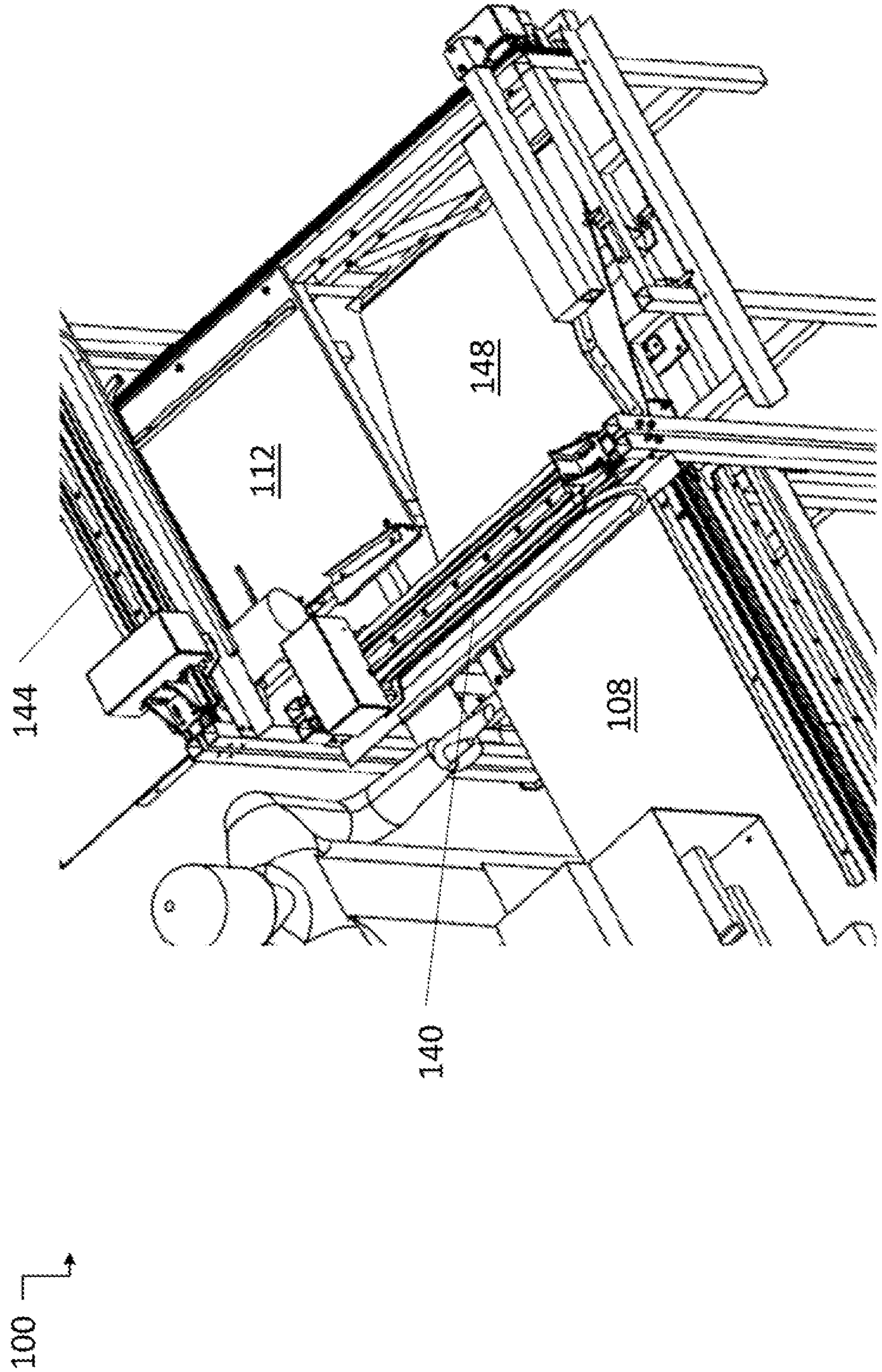
FIG. 3 is a perspective view of the system for artisanal ice cutting in accordance with the disclosed subject matter.

With continued reference to FIG. 1, system 100 may include a first sliding table 108. First sliding table 108 may be a generally planar platform having any suitable planform shape. FIGS. 1 and 2 depict the first sliding table 108 as a generally rectilinear platform having a flat surface configured to allow a loaded ice sheet to translate over the first sliding table 108. In various embodiments, first sliding table may have a first end and a second end, defining a length along a long axis therebetween. The first sliding table may be longer along the long axis than it is wide between its lateral edges. In various embodiments, first sliding table 108 may have a long axis in a first direction, the first sliding table 108 extending in said first direction. In various embodiments, the first sliding table 108 may be formed from a food grade plastic, high-density polyethylene (HDPE), aluminum or another material. In various embodiments, first sliding table 108 may be formed from plywood or a wood slab. In various embodiments, first sliding table 108 may be formed from a material having a low thermal conductivity, the first sliding table 108 configured to prevent ice sheets from melting due to convective heating from the first sliding table 108.

In various embodiments, first sliding table 108 may have any number of legs or support beams, crossbeams, trusses or other standing components configured to suspend the first sliding table 108 from the floor. In various embodiments, system 100 may be formed from a single subframe with each component affixed thereto. In various embodiments, first sliding table or any component may be formed from disparate components and affixed together via mechanical fasteners or by relative placement in a room. The legs can be independently adjustable (e.g. telescoping leg members) to selectively set each leg at any desired height—thus creating any desired pitch or "tilt" to the upper surface or table associated with that particular leg(s); thus each upper surface or table, can likewise be independently adjusted to any desired pitch/tilt as well.

In various embodiments, the entirety of the first sliding table 108 may be angled slightly upwards such as the second end is slightly above the first end, such that the ice sheet is moving uphill slightly in order to align the ice rods after cutting from the ice sheet. In various embodiments, first sliding table 108 may include a downwardly sloped or downhill portion disposed proximate the second end. The downwardly sloped portion may be configured to eject or locomote the cut ice rods from the ice sheet to a subsequent table, which will be described in greater detail herein below. The downwardly sloped portion may be disposed underneath the first saw guide 140 such that after cutting of the ice rods from the ice sheet, the ice rod is separated form the ice sheet and moves down the slope to the subsequent station/area of system 100.

First sliding table 108 may have a first fixed support 156 disposed along the long axis of the first sliding table 108. First fixed support 156 may be formed as a rail, which projects upwardly from the table surface 108, and is disposed along a lateral edge of the first sliding table 108, the first fixed support 156 extending along the entire lateral edge of the first sliding table 108. In various embodiments, the first fixed support 156 may extend only a portion of the first sliding table 108 or at periods along the edge of the first sliding table 108. In various embodiments, first fixed support 156 may be formed as a rail or wall on either lateral edge of the first sliding table 108. In various embodiments, first fixed support 156 may have a height extending from the planar surface of the first sliding table 108. In various embodiments, the first fixed support 156 may have an adjustable height based on the desired ice cutting operation. First fixed support 156 may be mechanically coupled to first sliding table 108 via mechanical fasteners or be integral to the first sliding table 108. In various embodiments, first sliding table 108 may be angled upward at a lateral edge to form the first fixed support 108. In various embodiments, the first fixed support 156 may be disposed at a right angle to the planar surface of the first sliding table 108. In various embodiments, the first fixed support 156 may be disposed at an angle to the planar surface of the first sliding table 108 between 0 and 180 degrees.

Figure 8:
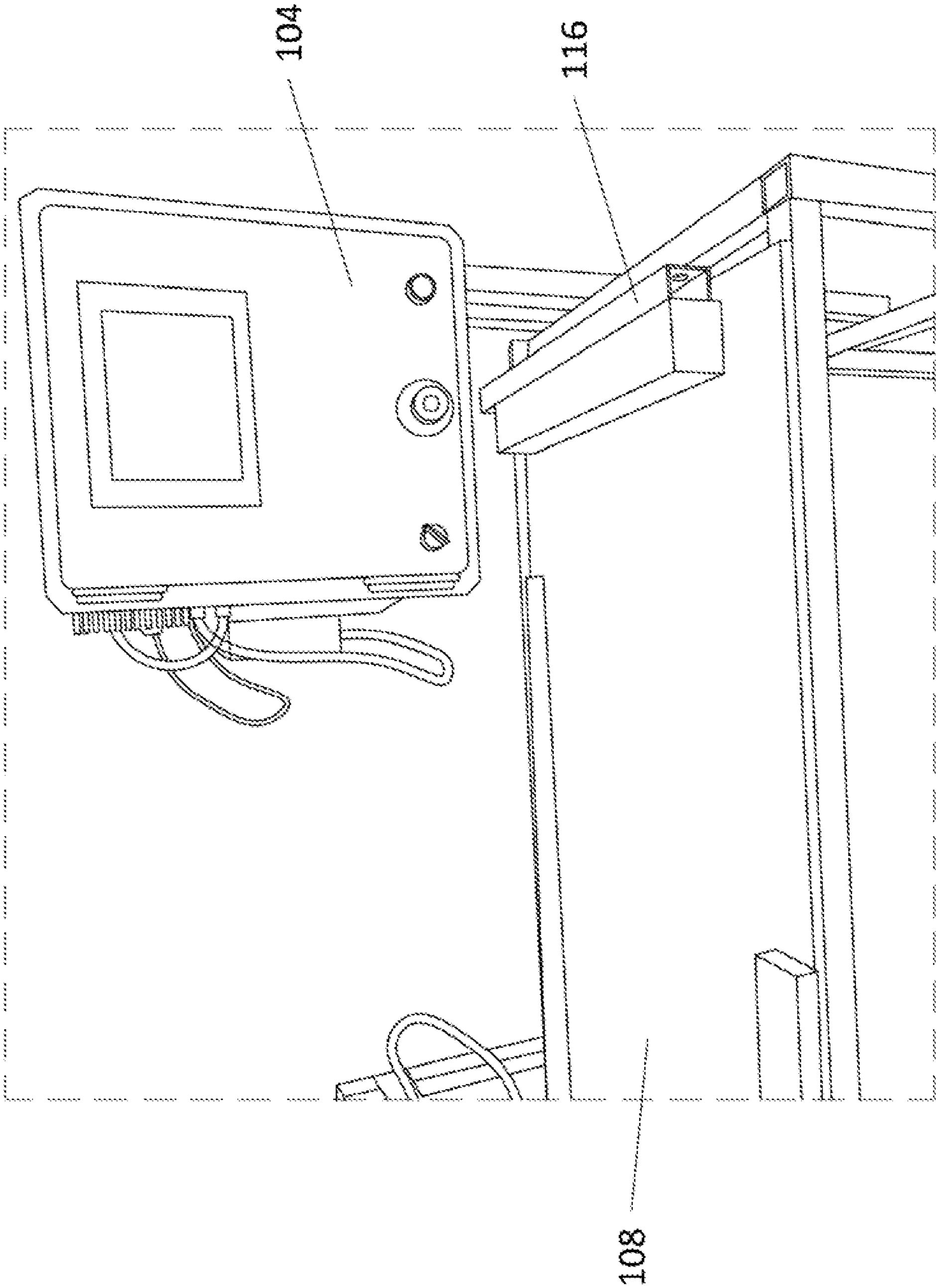
FIG. 8 is a perspective view of a sliding table and control unit of a system for artisanal ice cutting in accordance with the disclosed subject matter.
Figure 9:
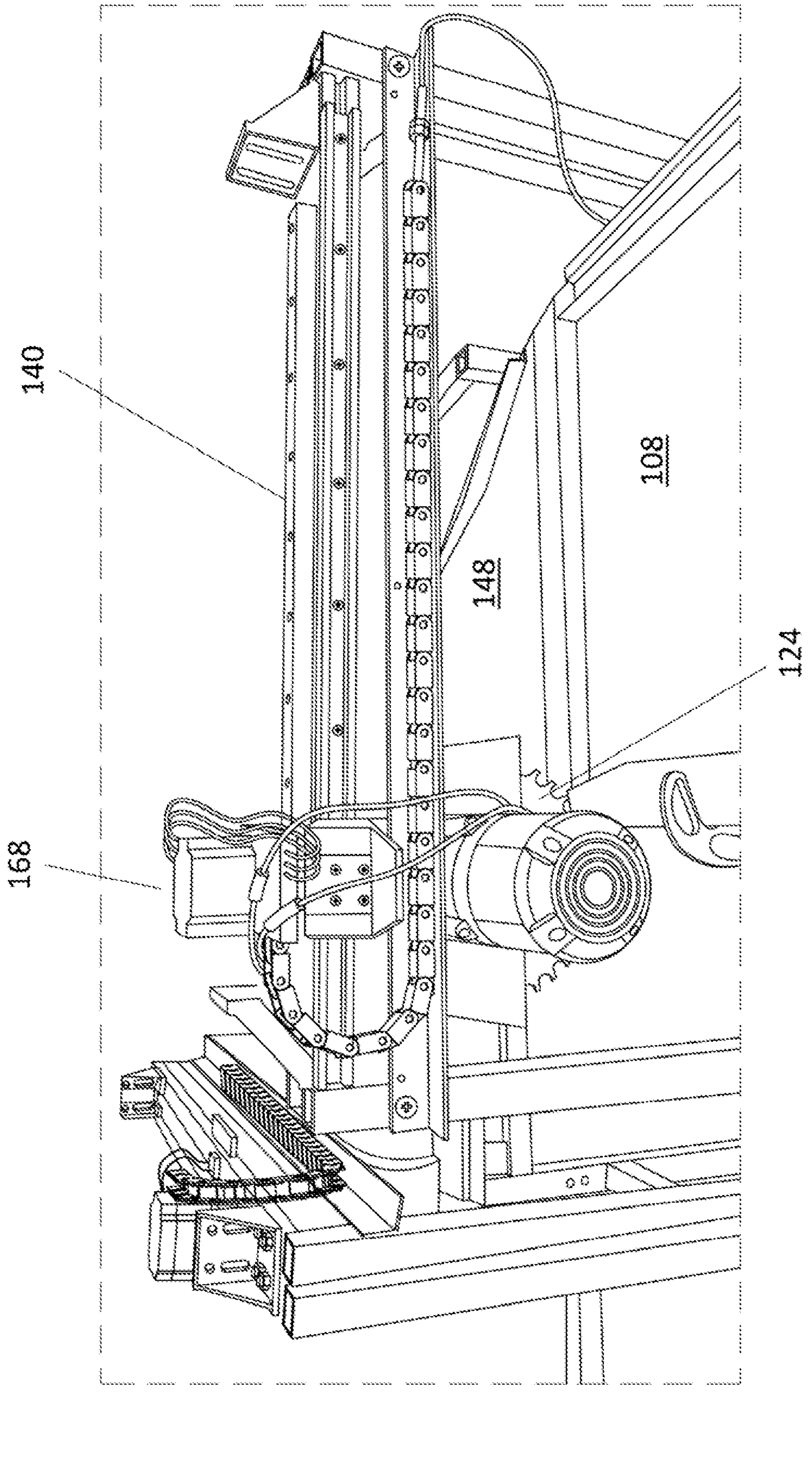
FIG. 9 is a perspective view of a sliding table and saw guide of a system for artisanal ice cutting in accordance with the disclosed subject matter.
Figure 10:
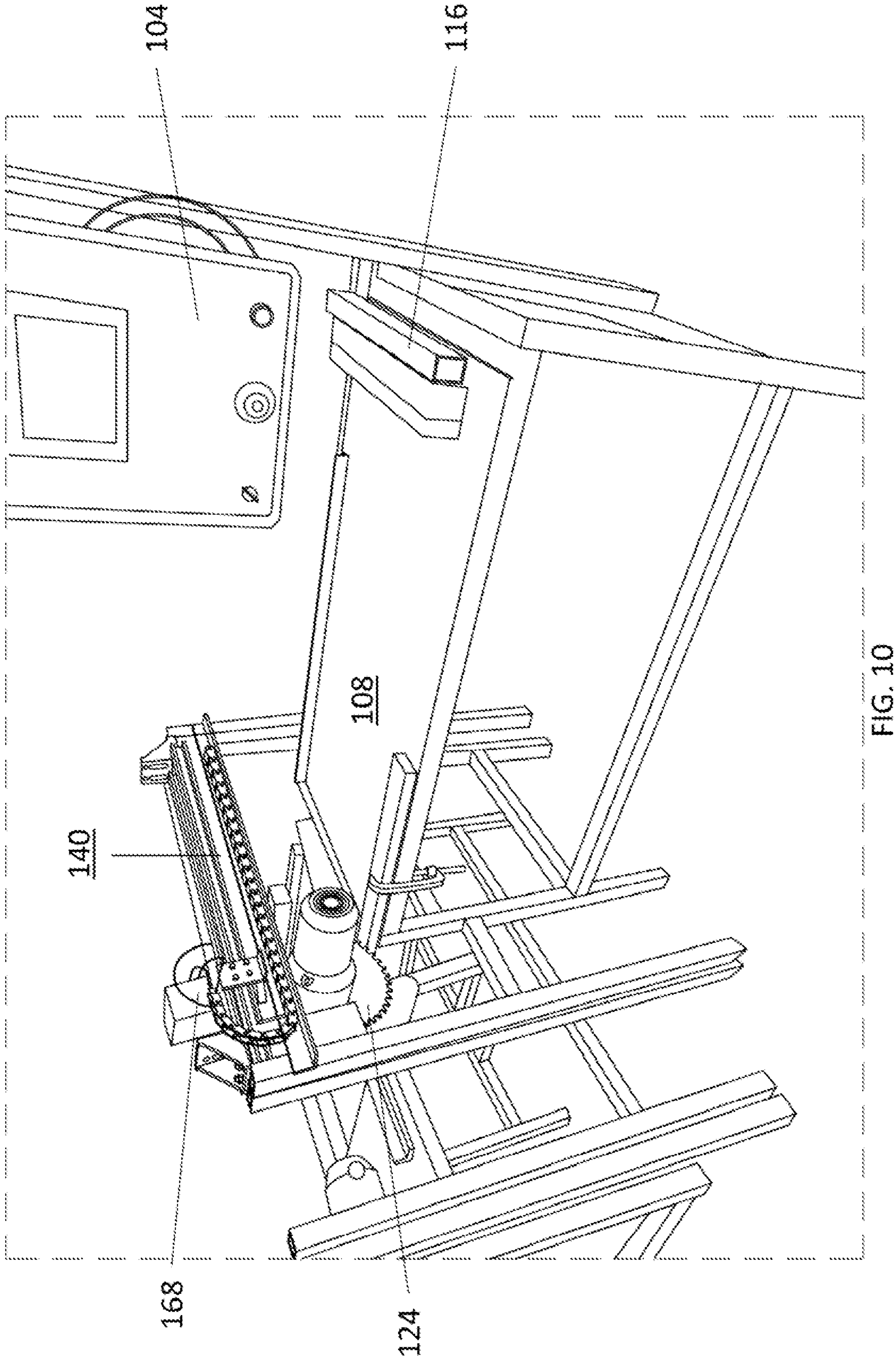
FIG. 10 is a perspective view of a sliding table and control unit of a system for artisanal ice cutting in accordance with the disclosed subject matter.

With continued reference to FIG. 1, system 100 includes a first pushing arm 116 movably coupled (e.g. sliding/translational movement) to the first sliding table 108. In various embodiments, the first pushing arm 116 may be disposed laterally across the short axis of the first sliding table 108 and configured to translate from the first end of the first sliding table to the second end of the sliding table, thereby pushing an ice sheet along the first sliding table 108 to be cut by the first saw 124. First pushing arm 116 may be configured to translate along the first direction of first sliding table 108 under the power of a first arm control motor 164. First pushing arm 116 may extend the entire lateral distance of the first sliding table 108. In various embodiments, first pushing arm 116 may extend a portion of the lateral distance of the first sliding table 108. In various embodiments, first pushing arm 116 may be formed from any suitable material such as aluminum or another metal or composite/alloy. In various embodiments, first pushing arm 116 may include one or more pads or contacting areas configured to come in contact with ice sheet and reduce convective heating of the ice through the material. In various embodiments, first pushing arm 116 may include a foam or other textile-type material with a soft contacting area as shown in FIGS. 8 and 10. The foam portion of first pushing arm 116 may be configured to reduce chips of the ice sheet during translation of the first pushing arm 116 and sliding of the ice sheet along the first sliding table 108.

Figure 4:
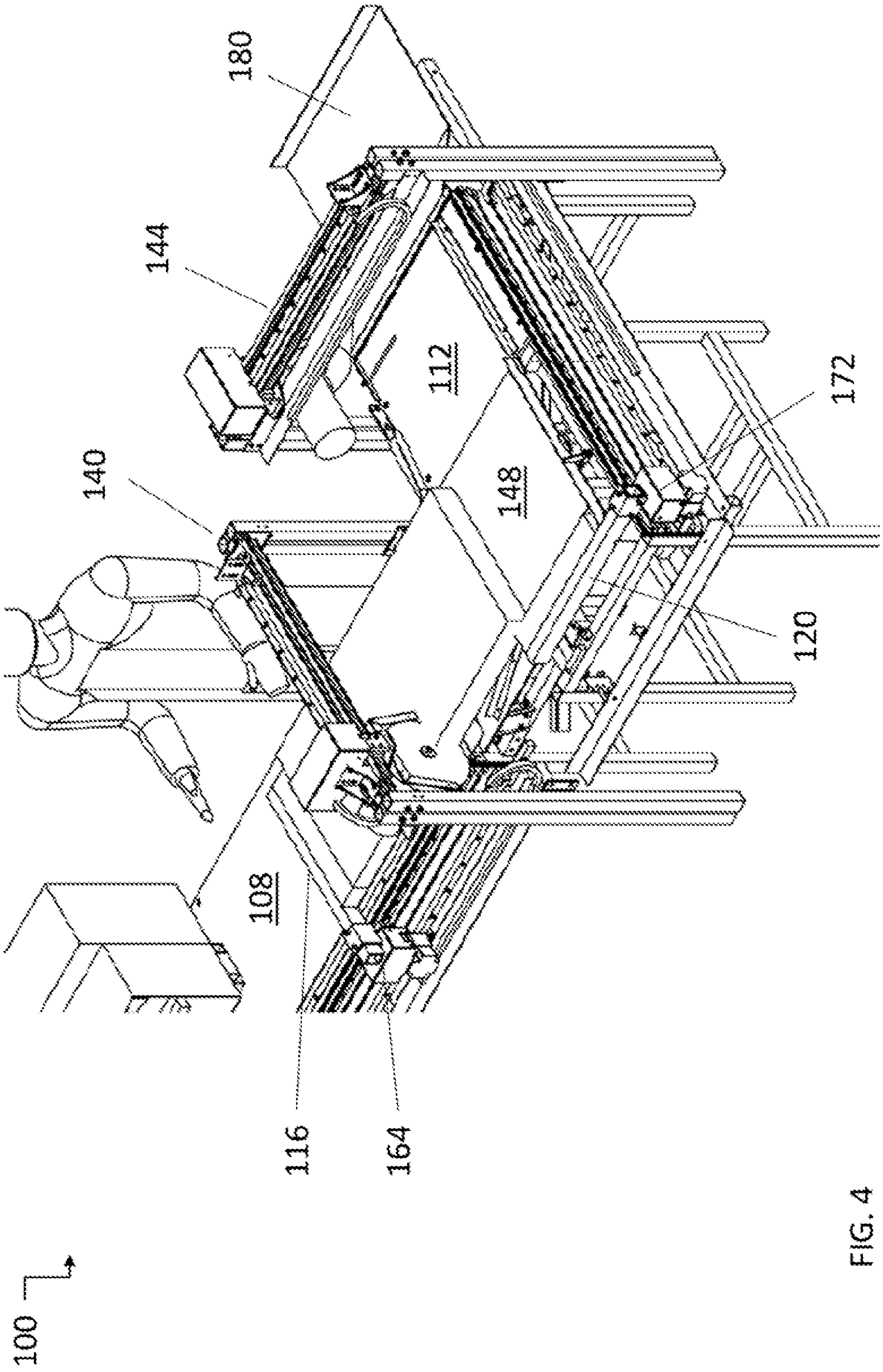
FIG. 4 is a perspective view of the system for artisanal ice cutting in accordance with the disclosed subject matter.

As shown in FIG. 2, first pushing arm 116 is configured to translate along the first direction of the first sliding table 108 (with the original location of pushing arm 116 shown in phantom), thereby moving the ice sheet to a cutting position under the first saw 124. In various embodiments, first arm control motor 164 may be a motor affixed to a first arm guide 132 (as shown in FIG. 4). In various embodiments, the first arm guide 132 may be disposed along a lateral edge of the first sliding table 108. In various embodiments, the first arm guide 132 may be a linear actuator, rail or channel that an actuator translates along, the actuator configured to move the first pushing arm 116 along the first direction of the first sliding table 108. In various embodiments, the first arm guide 132 may be a worm screw, where the first pushing arm 116 is configured to translate along the worm screw in response to rotation of the control motor 164. First arm control motor 164 may be configured to actuate or rotate in response to one or more electrical signals sent by the control unit 104. First arm control motor may be configured to continuously translate thereby moving the first pushing arm 116 along the first direction or in discrete steps. In various embodiments, each successive step may require a confirmation signal from first saw 124 or another component of the system 100 to alternate successive pushing of the ice sheet after each cut is made by the first saw 124.

First pushing arm 116 is configured to push the ice sheet along the first sliding table 108 underneath and in the path of the first saw 124. First pushing arm 116 will push the ice sheet to the first cutting position where only a desired section of the ice sheet will be in the path of first saw 124. This way the first pushing arm 116 is calibrated to step the width of the desired first cut, such that each successive step defines the width of the ice rods cut from the ice sheet. In various embodiments, the unfinished leading edge of the ice sheet may be automatedly cut off by the first saw 124, or manually, prior to loading of the ice sheet on the first sliding table 108.

With continued reference to FIG. 1, system 100 includes a first saw 124. First saw 124 may be a circular saw. In various embodiments, first saw 124 may be a jigsaw, reciprocating saw, bandsaw or another suitable saw. In various embodiments, saw 124 may be a toothed saw. In various embodiments, first saw 124 may be a continuous smooth edged saw, similar to a knife edge. In various embodiments, first saw 124 may be a granular or other type of friction-based saw, such as a diamond or masonry saw. First saw 124 may be disposed laterally adjacent with respect to the first sliding table 108, such that the saw is disposed at a right angle to the first direction of translation of the ice sheet along the first sliding table 108.

First saw 124 may be translatably and rotatably affixed to first saw guide 140. First saw guide 140 may be a rail or track disposed perpendicular to the first sliding table 108 and spaced a height above the first sliding table 108. First saw guide 140 may be coupled or suspended between two or more supports or columns, which can also be varied in height such that the saw guide 140, and saw 124, can be raised/lowered to any desired height to accommodate ice sheets of varying thickness. In various embodiments, first saw guide 140 may be coupled to two supports disposed at the lateral edges of the first sliding table 108. In various embodiments, first saw guide 140 may disposed above the second end of the first sliding table 108.

First saw 124 may be translatably coupled to the first saw guide 140 via one or more worm screws or other linear actuators that facilitates the first saw 124 movement along the first saw guide 140. First saw control motor 168 may be mechanically coupled to first saw 124 and the first saw guide 140 such that actuation of the first saw control motor controls the translation of first saw 124 along the first saw guide 140. First saw control motor 168 may additionally or alternatively control the rotation of first saw 124. In various embodiments, first saw guide 140 may include a first and second actuator, the first actuator configured to control the translation of the first saw 124 and the second actuator configured to control the rotation of the first saw 124 to perform a cut. In various embodiments, distinct actuators may be utilized for rotation of the saw blade of first saw 124 and translation of first saw 124 along first saw guide 124. One of skill in the art would appreciate the first and the second actuators may alternatively control one of the translation and rotation of the first saw 124. In various embodiments, each of the first actuator and the second actuator may each be configured to actuate the translation and the rotation of the first saw 124 in concert. In various embodiments, one or both of the first and the second actuators are electric motors.

In various embodiments, first saw 14 may be configured to rotate such that the friction between the saw and the ice will force the ice against the fixed support 156 and downward, thereby maintaining the relative position of the ice and the saw. In various embodiments the saw may rotate such that snow or ice cuttings are ejected off of the first sliding table 108 and away from the cut, thereby ensuring no cuttings interfere with the quality of the cut in the ice. In various embodiments, the first saw 124 may rotate in a direction configured to eject the cuttings from the at least one first cut transversely to the first sliding table 108. In various embodiments, ejecting the cuttings transverse to the first sliding table 108 may include ejecting the cuttings off of the first sliding table 108 and away from the cut and any subsequent cuts. In some embodiments, an ice cutting deflector or shroud can be included on the saw or on saw guide 140, to divert the snow away from the ice block (e.g. towards, and on the left side, of the operator shown in FIG. 1). Additionally or alternatively, in some embodiments the apparatus can also include a pneumatic nozzle to provide pulses/jets of air to further direct the ice cuttings/snow away from the ice sheet.

In various embodiments, first saw 124 can be configured to continuously and returnably translate along first saw guide 140, such that first saw 124 translates along the first saw guide 124, across table 108, to make the cut in the ice sheet and return to its starting position prior to the ice sheet moving underneath the saw and aligning the next cut. In various embodiments, first saw 124 may be configured to make a first cut translating across the ice sheet in a first pass along a first line of the ice sheet, and make a second cut as it translates back to its starting position in a second pass (the second pass can retrace the line of the first pass, or be indexed/offset to travel along a separate laterally spaced line). In various embodiments, the ice sheet may be pushed underneath the saw in between the first and the second pass such that a first cut is made in the first pass and a second cut is made in a second pass over the first sliding table 108. In non-limiting embodiments, first saw 124 may be tilted with respect to the first sliding table 108, such that the cuts are made an angle to the first sliding table 108, resulting in non-normal cuts of ice.

Figure 12:
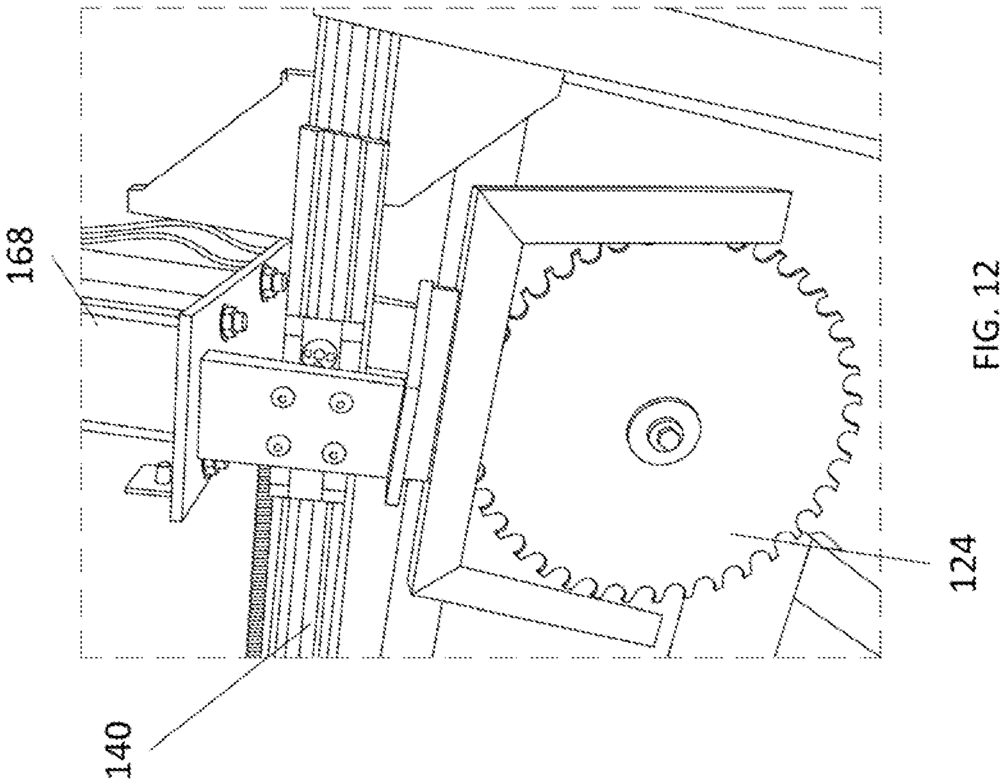
FIG. 12 is representation of a saw and saw guide in accordance with the disclosed subject matter.
Figure 13:
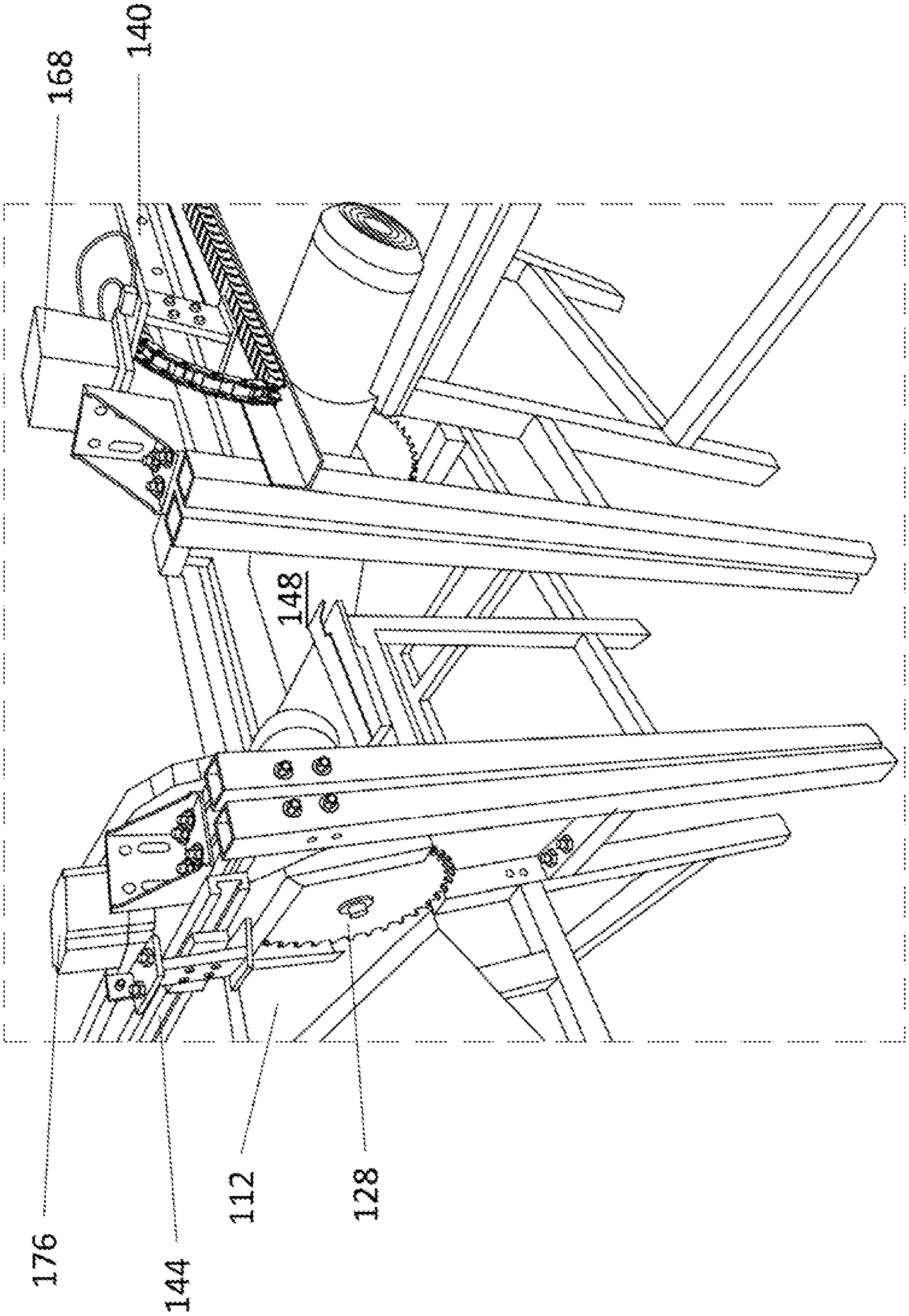
FIG. 13 is a perspective view of a first and second saw guides and saws in accordance with the disclosed subject matter.
Figure 14:
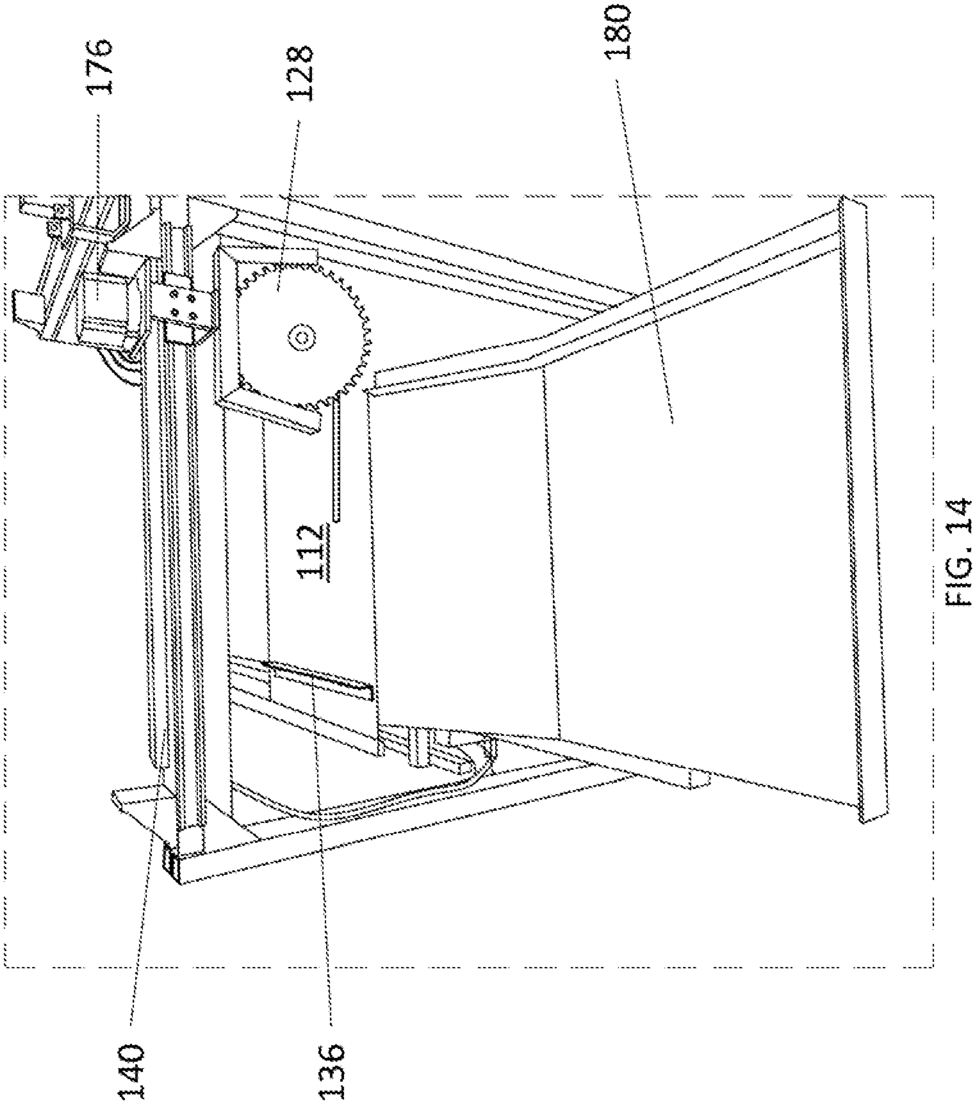
FIG. 14 is an elevation view of an endplate of a system for artisanal ice cutting in accordance with the disclosed subject matter.
Figure 15:
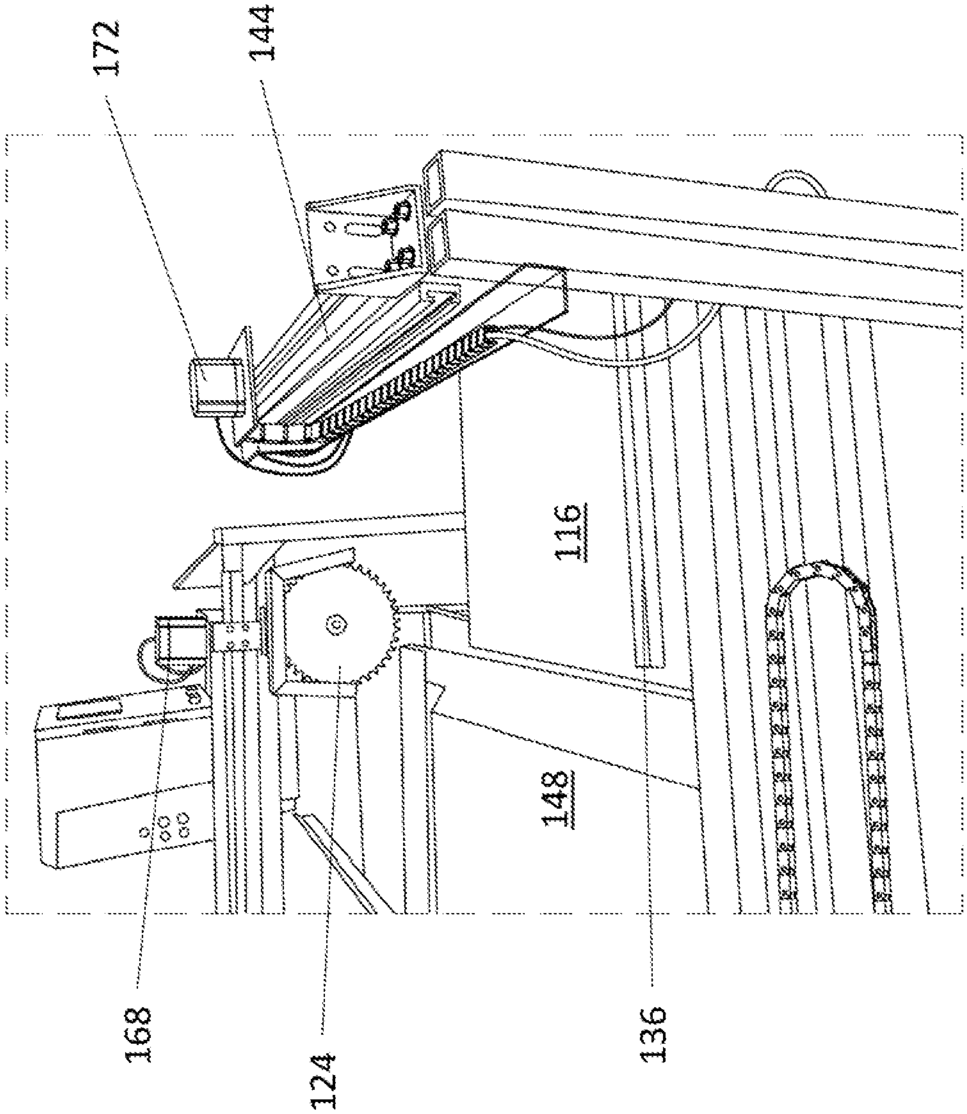
FIG. 15 is an elevation view of a perpendicular first and second sliding table showing the first and second saw guides with the pivot table in an up position in accordance with the disclosed subject matter.
Figure 16:
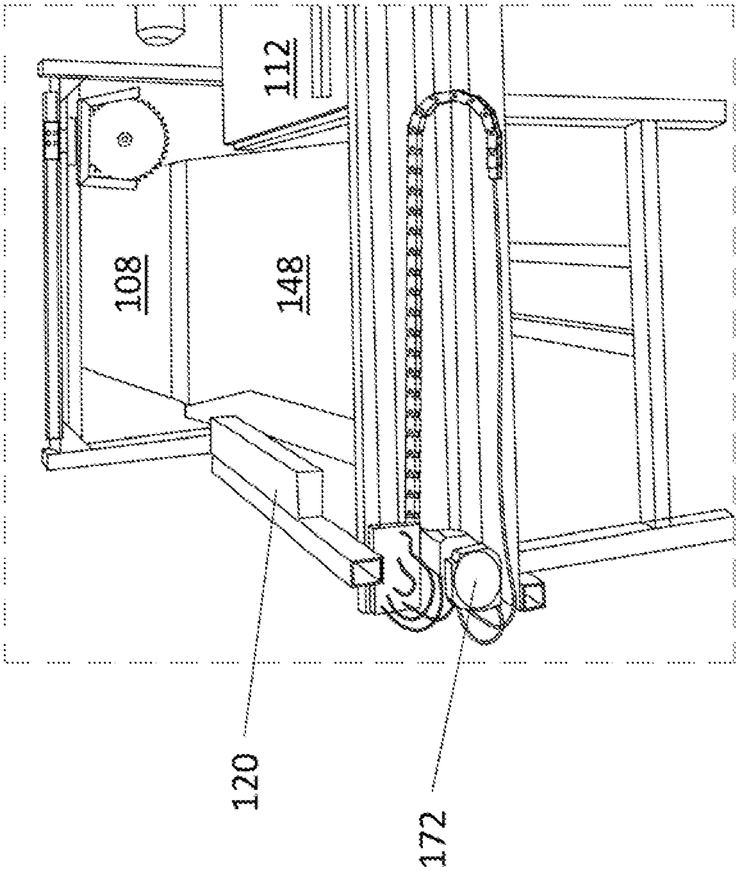
FIG. 16 is an elevation view of a perpendicular first and second sliding table showing the first and second saw guides with the pivot table in an downward position in accordance with the disclosed subject matter.
Figure 17:
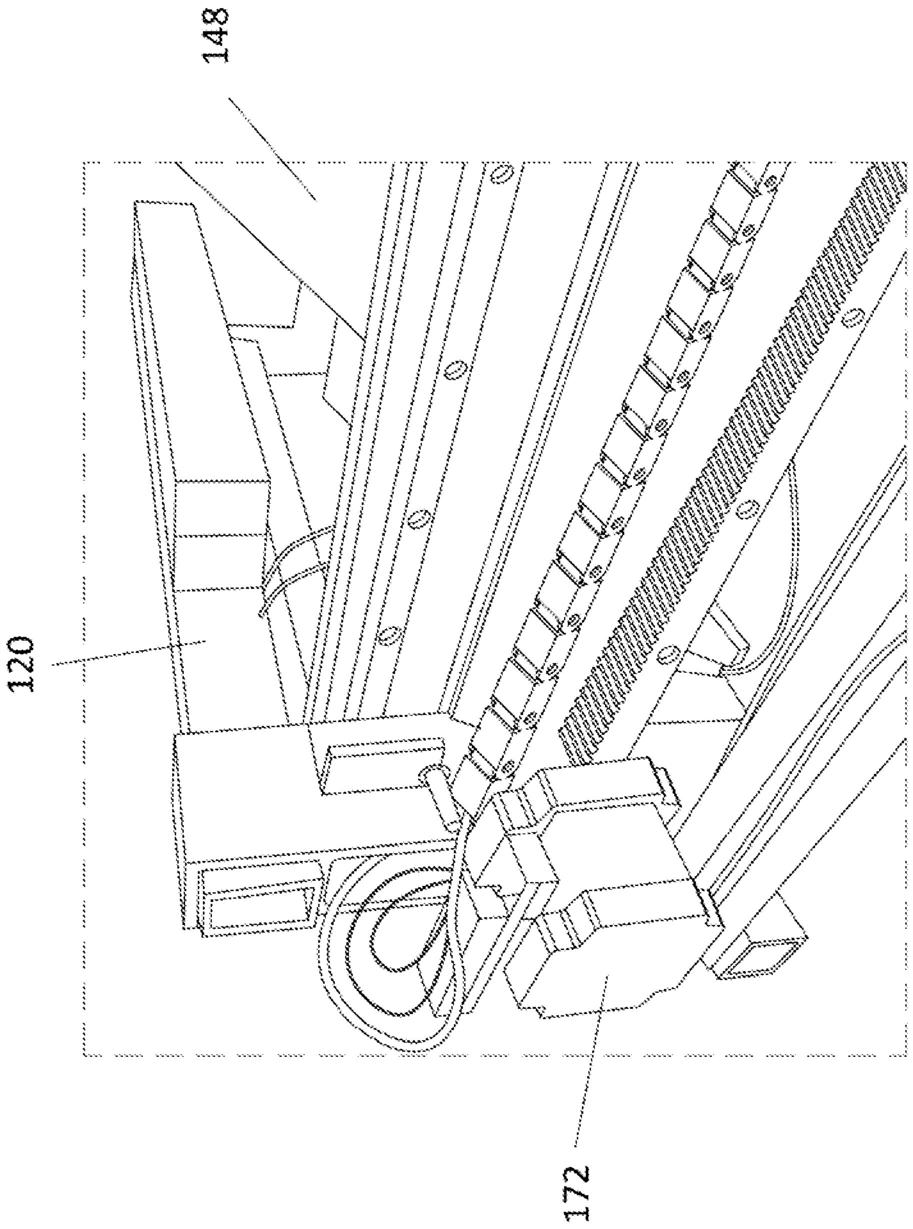
FIG. 17 is a detail view of a linear actuator and second pushing arm of a system for artisanal ice cutting in accordance with the disclosed subject matter.

In various embodiments, one or more saws of the first saw 124 or second saw 128 may be 10" inch circular saws. In various embodiments, one or more of these saws may be configured for cutting ice, wood, concrete, metal or another material-specific saw. In various embodiments, any component, such as the saws, may be configured for operation at freezing air temperatures, such that the ice sheets do not prematurely melt during the cutting and/or moving processes. In various embodiments, the one or more saws, such as first saw 124 and second saw 128 may include one or more hoods, shields or other covers configured to block the non-cutting portion of the saws from contacting any components or the user's body, such as the user's hands as shown in FIG. 12. Due to the automated actuation of the saws rotation and translation relative to the ice sheets, the need for a user's hands to be close the cutting portion of the saw blades is removed, which can drastically reduce the probability of a work injury.

With continued reference to FIG. 1, system 100 includes a pivot table 148. Pivot table 148 may be disposed proximate the second end of the first sliding table 108 and extending collinearly with the first sliding table in the first direction. Pivot table 148 may be hingedly coupled to the second end of the first sliding table 108. Pivot table 148 may be mechanically coupled to one or more linear or other actuators configured to rotate or pivot the pivot table 148 about an axis transverse to the second end of the first sliding table 148. As the pivot table 148 pivots downwards, the proximal portion of the pivot table 148 to the first sliding table is generally coplanar and the distal portion of the pivot table 148 is substantially downhill from the first sliding table 108. In various embodiments, the pivot table 148 may pivot over an angle of 0-90 degrees. In various embodiments, the pivot table 148 may be configured to selectively rotate about a certain angle, for example based on amount of ice rods dispose thereon. In various embodiments, pivot table 148 may pivot downward after each successive ice rod is cut off the ice sheet, thereby aligning the ice rods on the pivot table 148 via gravity.

Figure 18:
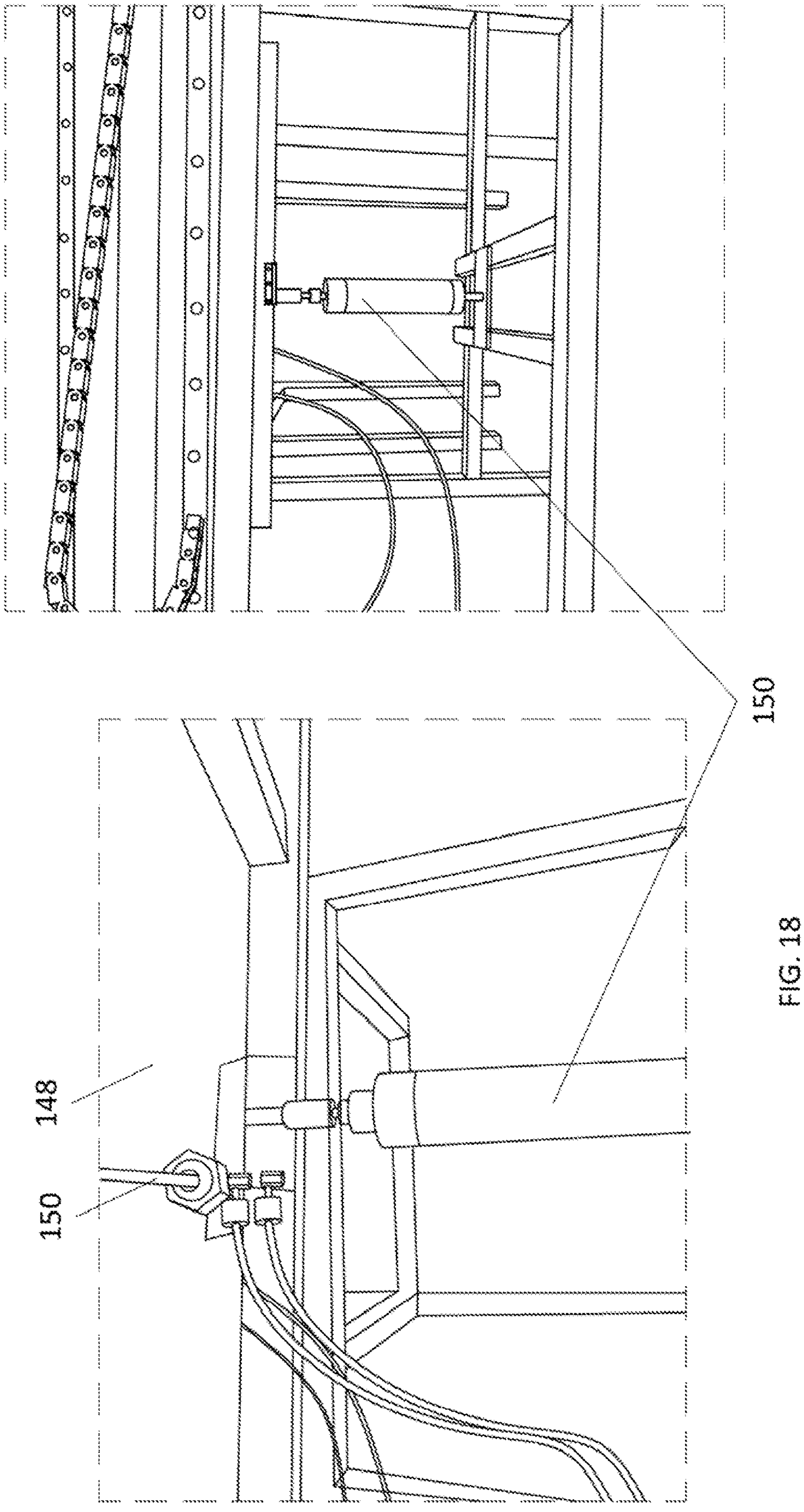
FIG. 18 is a upward view of an actuator coupled to the pivot table in accordance with the disclosed subject matter.

Pivot table 148 may include one or more pivot actuators 150 (as shown in FIG. 18). Pivot actuators 150 may be coupled to an underside of the pivot table 148 and away from the planar top surface. Pivot actuator 150 may be coupled to a distal portion of the pivot table 150, wherein a linear actuation of the pivot actuator 150 pivots the pivot table 148 about an angular path. In various embodiments, pivot actuator 150 may be one or more pistons as shown in FIG. 18. In various embodiments, pivot actuator 150 may be configured as a hydraulic piston, where a piston rod which is hingedly coupled to the underside of the pivot table 148 extends or retracts into the pivot actuator 150 cylinder in response to the pumping or suction of hydraulic fluid into the pivot actuator 150 cylinder. In various embodiments pivot actuator 150 may be an electric motor, such as a servo or stepper motor disposed at a proximal or hinge-side portion of the pivot table 148, where electrical signals can command the stepper motor to rotate a certain degree range, thereby pivoting the pivot table 148. In various embodiments, the pivot table 148 may have a number of supports disposed at the underside of the pivot table 148 configured to support the weight of the ice on the pivot table 148, while the stepper motor moves the pivot table over a desired range. One of skill in the art would appreciate the variety of actuators that can be employed to pivot the pivot table 148 as described herein, this disclosure does not limit the selection of said pivot actuators.

Figure 5:
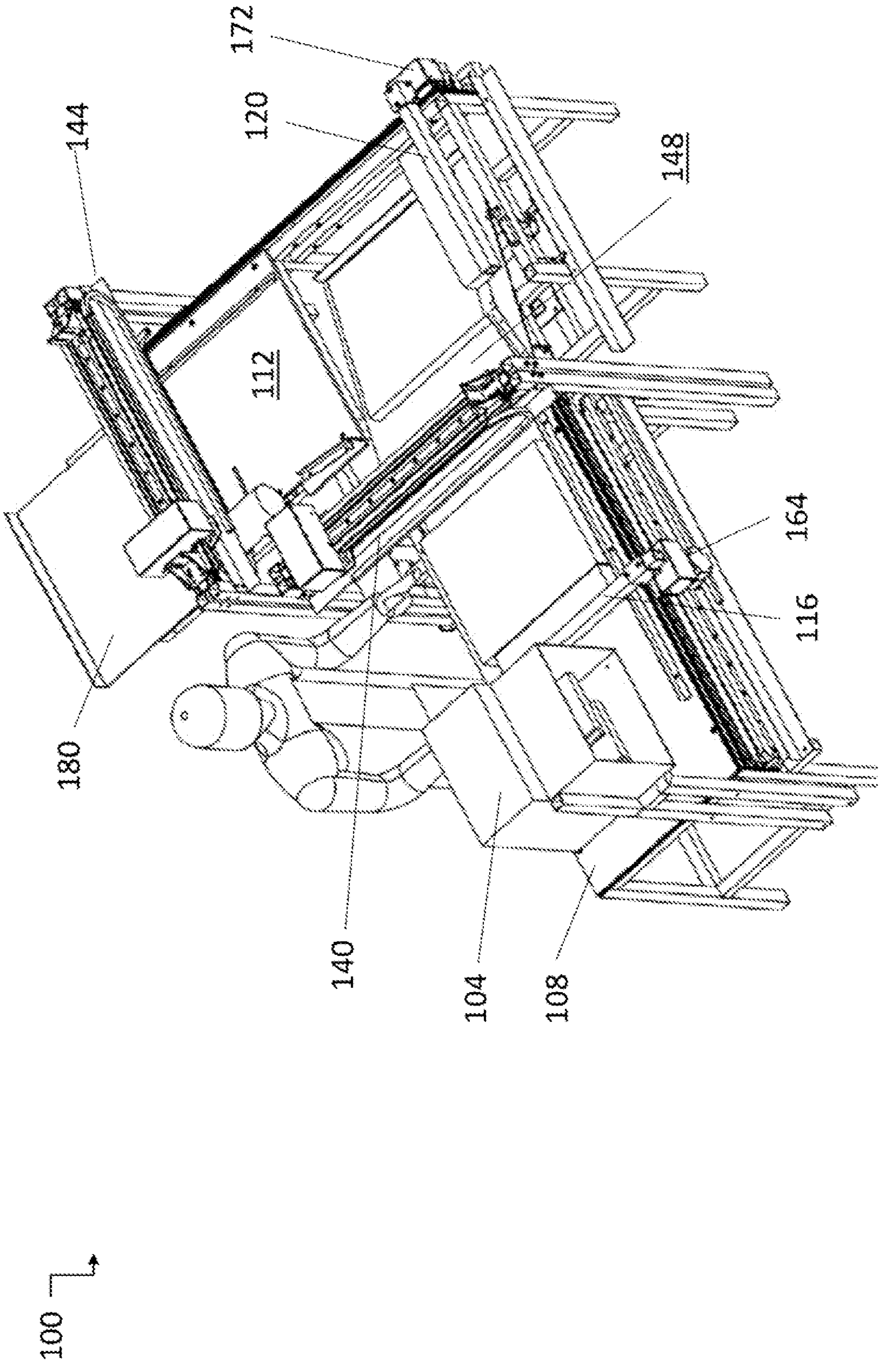
FIGS. 5-7 are elevation views of the system for artisanal ice cutting in accordance with the disclosed subject matter.

In various embodiments, the pivot table 148 pivots downward after every ice rod is cut off of the ice sheet, thereby aligning the entirety of the ice that formed the ice sheet, now in elongated ice rod form, before translating said ice rods in the second direction and to the second saw 128 (to be formed into cubes). The pivot table 148 can be seen in the pivoted downward position in FIG. 1 with no ice sheet disposed thereover (for clarity). FIG. 2 depicts the pivot table 148 in the downward position with the planar ice sheet translating thereover. One of skill in the art would appreciate this is a schematic representation only, and that the ice moving towards the pivot table would be in rod form by cutting from the first saw 124. FIG. 5 depicts the pivot table 148 in the downward pivot position with an aligned set of ice rods disposed thereon, gravity forcing the ice rods into alignment against the downward-most portion of the pivot table 148. Pivot table 148 may include one or more sensors configured to detect pivot position, pivot angle, weight of ice on the pivot table surface, among other phenomena.

In various embodiments, after first pushing arm 116 has reached the first saw 124, and all ice rods are cut from ice sheet, pivot table 148 will move to the downward position so that the cut ice rods can move to the end of the pivot table and pushing arm 120 can move into its starting position, such as returning from a fully actuated position proximate the second saw 128. The control unit 104 may command the second pushing arm 120 to remain still during the pivoting of pivot table 148 so no ice disposed on the pivot table 148 is damaged by the second pushing arm 120 translating over the pivot table 148 and the second sliding table 112. In various embodiments, pivot table 148 may include nay number of rails, guides or other supports configured to align, move or push the ice rods to a desired location of the pivot table 148, as seen in FIGS. 3-6, among others. Also, the pivot table can be vibrated to remove any debris (e.g. ice cuttings/snow) and/or place the cut elongated rods into close engagement (e.g. eliminating any spacing between rods).

With continued reference to FIG. 1, system 100 includes a second sliding table 112. Second sliding table 112 may be positioned perpendicularly to the first sliding table 108 and the pivot table 148. Second sliding table 112 may be disposed abutting a lateral edge of the pivot table 148. Second sliding table 112 may extend between a third end proximate the pivot table 148 and a fourth end, defining a length along a second direction therebetween. The second direction along which second sliding table 112 extends is perpendicular to the first direction along which the first sliding table 108 extends. In various embodiments, second sliding table 112 is a generally planar surface having a rectilinear planform shape, such as a rectangle or square. In various embodiments, the second sliding table 112 may be generally longer along the second direction than it is wide. In various embodiments, second sliding table 112 may be disposed at a longitudinal edge of pivot table 148, such that the point of pivot table 148 that pivots down the greatest distance is coincident with the lateral edge of the second sliding table 112, as shown in FIGS. 1-7, at least.

In various embodiments, the second sliding table 112 may be formed from a food grade plastic, high-density polyethylene (HDPE), aluminum or another material. In various embodiments, second sliding table 112 may be formed from plywood or a wood slab. In various embodiments, second sliding table 112 may be formed from a material having a low thermal conductivity, second sliding table 112 configured to prevent ice sheets from melting due to convective heating from second sliding table 112.

In various embodiments, second sliding table 112 may have any number of legs or support beams, crossbeams, trusses or other standing components configured to suspend second sliding table 112 from the floor. In various embodiments, system 100 may be formed from a single subframe with each component affixed thereto. Likewise to the description of the first table 108 above, second sliding table 112 or any component may be formed from disparate components and affixed together via mechanical fasteners or by relative placement in a room and include all the functionality previously described in connection with table 108.

In various embodiments, the entirety of the second sliding table 112 may be angled slightly upwards such as the second end is slightly above the first end, such that the ice sheet is moving uphill slightly in order to align the ice rods after cutting from the ice sheet. In various embodiments, second sliding table 112 may include a downwardly sloped or downhill portion disposed proximate the second end. The downwardly sloped portion may be configured to eject or locomote the cut ice rods from the ice sheet to a subsequent table such as the end table 180, which will be described in greater detail herein below. The downwardly sloped portion may be disposed underneath the second saw guide 144 such that after cutting of the ice blocks from the ice rods, the ice block is separated form the ice rod and moves down the slope to the subsequent area of system 100. In various embodiments, second sliding table 112 may be generally shorter along the second direction than first sliding table 108 along the first direction. For example and without limitation, the first sliding table 108 may be longer than the second sliding table 112 to form an "L-shaped" planform shape, with the second sliding table 112 forming the horizontal portion of the 'L', and abutting the pivot table 148. For example and without limitation, the first sliding table 108 may be shorter than the second sliding table 112 to form an "L-shaped" planform shape, with the second sliding table 112 forming the vertical portion of the 'L'.

Second sliding table 112 may have a second fixed support 160 disposed along the long axis of the first sliding table 108. Second fixed support 160 may be formed as a rail disposed along a lateral edge, the second fixed support 160 extending along the entire lateral edge of second sliding table 112. In various embodiments, second fixed support 160 may extend only a portion of the second sliding table 112 or at periods along the edge of the second sliding table. In various embodiments, second fixed support 160 may be formed as a rail or wall on either lateral edge of the second sliding table 112. In various embodiments, second fixed support 160 may have a height extending from the planar surface of second sliding table 112. In various embodiments, second fixed support 160 may have an adjustable height based on the desired ice cutting operation. Second fixed support 160 may be mechanically coupled to second sliding table 112 via mechanical fasteners or be integral to second sliding table 112. In various embodiments, second sliding table 112 may be angled upward at a lateral edge to form the second fixed support 160. In various embodiments, second fixed support 160 may be disposed at a right angle to the planar surface of second sliding table 112. In various embodiments, the second fixed support 160 may be disposed at an angle to the planar surface of the first sliding table 108 between 0 and 180 degrees. In various embodiments, second fixed support 160 may be collinear with one or more lateral edges of the pivot table 148 to form a smooth transition along which ice can ride as it is pushed along the second sliding table 112 by the second pushing arm 120.

In various embodiments, second sliding table 112 may include a downwardly sloped or downhill portion disposed proximate the fourth end. The downwardly sloped portion may be configured to eject or locomote the cut ice blocks from the ice rods to an endplate 180. The downwardly sloped portion may be disposed underneath the second saw guide 144 such that after cutting of the ice blocks from the ice rods by the second saw 128, the ice blocks are separated form the ice rods, transported by gravity down the slope to the endplate 180 for collection by a user or deposition into a receptacle.

With continued reference to FIG. 1, system 100 includes a second pushing arm 120. Second pushing arm 120 may be disposed along the lateral edge of system 100 and extend perpendicularly to the second sliding table 112. Second pushing arm 120 may be configured to translate along the second direction over both the pivot table 148 and the second sliding table 112. Second pushing arm 120 may have a starting, rest or storage position at a lateral edge of the pivot table 148 such that pivoting of the pivot table 148 does not bring any ice disposed thereon in contact with the bottom of the second pushing arm 120 prior to the actuation. Second pushing arm may be translatably fixed to second arm guide 136. Second arm guide 136 may be disposed at a distal end of the pivot table 148 and extend along the lateral edge of second sliding table 112. Second arm guide 136 may extend the entire longitudinal distance of the second sliding table 112 and terminate underneath the second saw guide 144, which will be discussed below.

Figure 6:
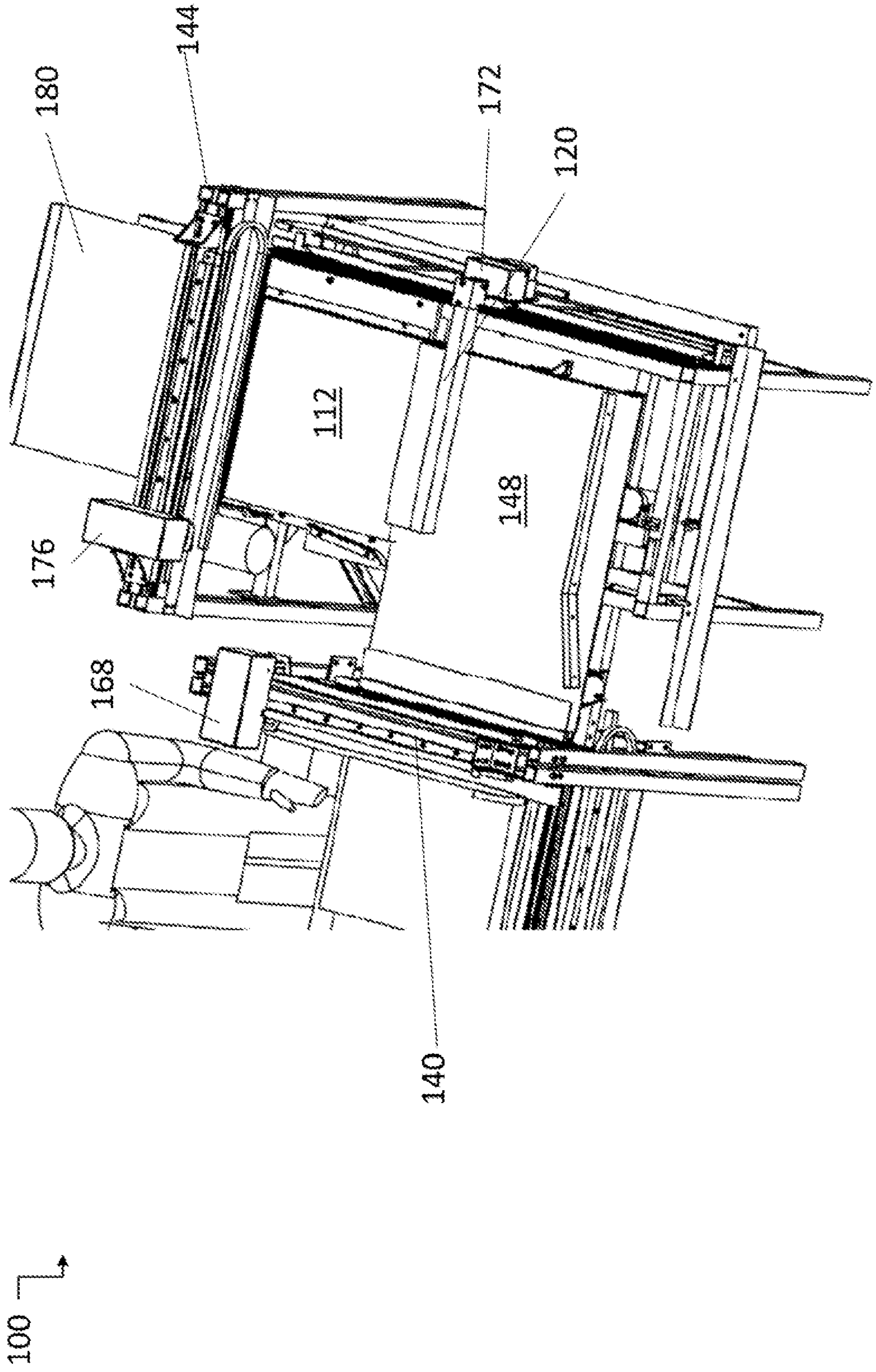

As shown in FIG. 6, second pushing arm 120 may be configured to translate along the second direction along the second sliding table 112, thereby moving the ice sheet to a cutting position under the second saw 128. In various embodiments, second arm control motor 172 may be a motor affixed to a second arm guide 136. In various embodiments, the second arm guide 136 may be disposed along a lateral edge of the first sliding table 108. Second pushing arm 120 may be configured to translate along the second arm guide under the power of the second arm control motor 172. The second arm control motor 172 may be a linear or rotating actuator configured to move the second pushing arm along the second arm guide 136. Second arm control motor 172 may be any suitable actuator, such as an electric motor, linear drive, or worm screw, among others. Second pushing arm 120 may be configured to push cut ice rods, which have been aligned on the pivot table 148, towards a second cutting operation on the second sliding table 112. Second pushing arm 120 may be configured to translate only when the pivot table 148 is in an upper, coplanar position with second sliding table 112.

In various embodiments, the second arm guide 136 may be a worm screw, where the second pushing arm 120 is configured to translate along the worm screw in response to rotation of the control motor 172. Second arm control motor 172 may be configured to actuate or rotate in response to one or more electrical signals sent by the control unit 104. Second arm control motor 172 may be configured to continuously move the second pushing arm 120 the second direction or move it in discrete steps. In various embodiments, each successive step may require a confirmation signal from second saw 128 or another component of the system 100 to alternate successive pushing of the ice sheet with each cut made by the second saw 128. Second pushing arm 120 is configured to push the ice sheet along the second sliding table 112 underneath and in the path of the second saw 128. Second pushing arm 120 will push the ice sheet to the second cutting position where only a desired section of the ice rod will be in the path of second saw 128, thereby defining the size of the ice block cut form the ice rod. This way the second pushing arm 120 is calibrated to step the width of the desired second cut, such that each successive step defines the size of the ice blocks cut from the ice rods. In various embodiments, the unfinished or jagged leading tips of the ice rods may be automatedly cut off by the second saw 128 or manually removed prior to the second pushing arm 120 pushing the ice rods onto the second sliding table 112.

Second pushing arm 120 may extend the entire lateral distance of the second sliding table 112. In various embodiments, second pushing arm 120 may extend a portion of the lateral distance of second sliding table 112. In various embodiments, second pushing arm 120 may be formed from any suitable material such as aluminum or another metal or composite/alloy. In various embodiments, second pushing arm 120 may include one or more pads or contacting areas configured to come in contact with ice sheet and reduce convective heating of the ice through the material. In various embodiments, second pushing arm 120 may include a foam or other textile-type material with a soft contacting area as shown in FIGS. 8 and 10. The foam portion of second pushing arm 120 may be configured to reduce chips of the ice sheet during translation of the second pushing arm 120 and sliding of the ice sheet along second sliding table 112. In various embodiments, second pushing arm 120 may overhang pivot table 148 and second sliding table 112 but not contact either, only being coupled to the second arm guide 136. In various embodiments, second pushing arm 120 may be configured to fully contact the pivot table 148 and second sliding table 112 coplanar surfaces, such that the second pushing arm 120 effectively slides or wipes over the surfaces on which the ice is sliding.

With continued reference to FIG. 1, system 100 includes a second saw 128 disposed on a second saw guide 136. In various embodiments, the second saw guide 144 is disposed proximate the fourth end of the second sliding table 112. Second saw guide 144 is disposed transverse to the second direction, i.e., laterally across the second sliding table 112, and perpendicularly disposed to the first saw guide 140. The second saw guide 144 is disposed perpendicularly to the first saw guide 140 so as to perform a perpendicular cut to the ice rods than did the first saw 124 disposed on the first saw guide 140. Second saw guide 144 may be substantially identical to first saw guide 140, including a rail, channel or other track that second saw 128 translates along while rotating to make a cut in the ice disposed underneath. In various embodiments, the second saw guide 144 may be affixed to a common subframe as the second sliding table 112 or a distinct support and positioned over the second sliding table 112. In various embodiments, as depicted in at least FIGS. 1-7, 9 and 11, second saw guide 144 may be disposed perpendicular to first saw guide 140, each being affixed to the subframe of system 100. Second saw guide 144 may include second saw control motor 176 configured to control one or more of the translation of the second saw 128 and the rotation of the second saw 128 to perform the cut.

In various embodiments, second saw guide 144 may include a first actuator and a second actuator, the first actuator configured to control the translation of the second saw 128 along the second saw guide 144 and the second actuator is configured to control the rotation of second saw 128 to perform the cut. One of skill in the art would appreciate the first and the second actuators may alternatively control one of the translation and rotation of the second saw 128. In various embodiments, each of the first actuator and the second actuator may each be configured to actuate the translation and the rotation of the second saw 128 in concert. In various embodiments, one or both of the first and the second actuators are electric motors.

Similarly to first saw 124, second saw 128 may be configured to make a transverse cut of the ice rods on a first pass and return to its initial position in a second pass across the ice rods, traveling through the cut. In various embodiments, second saw 128 may make a first cut of the ice rods in a first pass, second pushing arm 120 may advance the ice rods another discrete step along second sliding table 112, and then second saw 128 can make a subsequent cut on a second pass as it returns to its starting position along the second saw guide 144. In non-limiting embodiments, second saw 128 may be tilted with respect to the second sliding table 112, such that the cuts are made an angle to the second sliding table 112, resulting in non-normal cuts of ice.

In various embodiments, the second saw 128 may rotate in a direction configured to eject the cuttings from the at least one second cut transversely to the second sliding table 112. In various embodiments, ejecting the cuttings transverse to the second sliding table 112 may include ejecting the cuttings off of the second sliding table 112 and away from the cut and any subsequent cuts. In various embodiments, the first saw 124 and the second saw 128 may eject the cuttings from each of the first and second cuts to a common point exterior to the first sliding table 108 and second sliding table 112. In various embodiments, the common point may be at the interior corner of the 'L' shaped system 100. In various embodiments, system 100 may include a receptacle to catch the cuttings at the common point. In various embodiments, the cuttings may be snow or relatively small ice chips. Additionally, the second cutting operation can likewise include the shroud and/or nozzle to divert ice cuttings/snow, as described above in connection with the first cutting saw 124.

Second saw may be a circular saw. In various embodiments, second saw 128 may be a jigsaw, reciprocating saw, bandsaw or another suitable saw. In various embodiments, second saw 128 may be a toothed saw. In various embodiments, second saw 128 may be a continuous smooth-edged saw, similar to a knife edge. In various embodiments, second saw 128 may be a granular or other type of friction-based saw, such as a diamond or masonry saw. As described hereinabove, in various embodiments, one or more saws of the first saw 124 or second saw 128 may be 10" inch circular saws. In various embodiments, one or more of these saws may be configured for cutting ice, wood, concrete, metal or another material-specific saw. In various embodiments, any component, such as the saws, may be configured for operation at freezing air temperatures, such that the ice sheets do not prematurely melt during the cutting and/or moving processes.

In various embodiments, the one or more saws, such as first saw 124 and second saw 128 may include one or more hoods, shields or other covers configured to block the non-cutting portion of the saws from contacting any components or the user's body, such as the user's hands as shown in FIGS. 9 and 12-15. Due to the automated actuation of the saws rotation and translation relative to the ice sheets, the need for a user's hands to be close the cutting portion of the saw blades is removed, which can drastically reduce the probability of a work injury.

Method of Operation of the Artisanal Ice Cutting Apparatus

Figure 19:
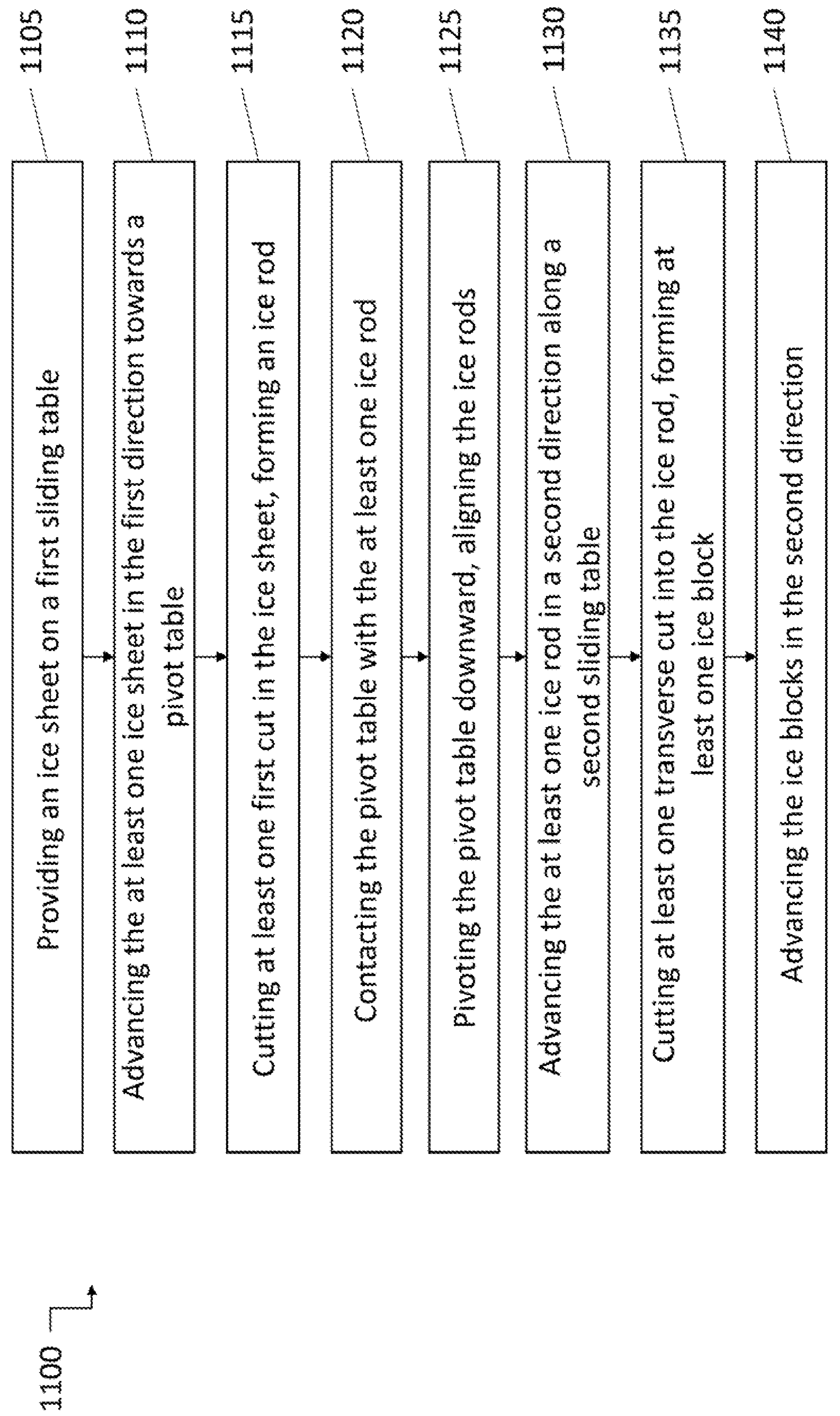
FIG. 19 is a flow diagram of a method for artisanal ice cutting in accordance with the disclosed subject matter.

Referring now to FIG. 19, a method 1100 for artisanal ice cutting is presented in flow diagram form. In various embodiments, method 1100 includes, at step 1105, providing an ice sheet on the first sliding table 108. As described above, providing the ice sheet onto the first sliding table 108 may be performed manually by a user. In various embodiments, providing the ice sheet onto the first sliding table 108 may be performed automatedly by a conveyor belt transporting and placing the ice sheet from a manufacturing apparatus or storage apparatus, like a commercial freezer or locker. In various embodiments, providing the ice sheet onto the first sliding table may include aligning the ice sheet against the first pushing arm 116 at the first end of the first sliding table and the first fixed support 156, constraining the rectilinear ice sheet along two perpendicular components. The ice sheet can be seen aligned with the first sliding table 108 and first fixed support 156 in FIGS. 4 and 5, where the rectilinear ice sheet is aligned with the rectilinear sides of the first sliding table 108. Providing the ice sheet onto the first sliding table 108 may include pressing the ice sheet against the first fixed support 156 and first pushing arm 116 by a user or other alignment fixture on the first sliding table 108.

With continued reference to FIG. 19, method 1100 for cutting artisanal ice, at step 1110, includes advancing the at least one ice sheet in the first direction along the first sliding table 108 towards the pivot table 148. Advancing the at least one ice sheet along the first sliding table 108 may include positioning the ice sheet underneath the first saw guide 140 and first saw 124. Advancing the ice sheet to a cutting position underneath the first saw 124 may include continuously advancing the ice sheet by first pushing arm 116. As described above, first pushing arm 116 may advance the ice sheet in discrete steps. The discrete steps or distance the ice sheet is advanced along the first sliding table 108 may be selected by the user via input to the control unit 104. The discrete step defines the width of ice rod cut form the ice sheet by the first saw 124, as will be described in the next step. FIGS. 2 and 4 show the first pushing arm 116 advancing the ice sheet along first sliding table 108 towards the pivot table 148 and underneath first saw 124 which is coupled to first saw guide 140. In various embodiments, the ice sheet can advance any distance in the first direction along first sliding table 108 in order to make the first cut in the ice sheet at any desired point in the ice sheet.

FIG. 2 depicts a phantom cut line along the ice sheet disposed directly under the first saw 124 blade. One of skill in the art would appreciate the depiction of the system 100 is illustrative, and any ice rods and any size ice sheet can be cut with the first saw 124. In various embodiments, even advancing the ice sheet past the distal portion of the pivot table 148 can be accomplished by pivoting the pivot table 148 downward and allowing the ice sheet to overhang the tables of the system 100 in order to make a cut in the ice sheet loner than the longitudinal distance between the first saw 124 and the distal portion of the pivot table 148.

With continued reference to FIG. 19, method 1100 for cutting artisanal ice includes, at step 1115, cutting at least one first cut in the ice sheet, thereby forming an ice rod from the ice sheet. The at least one first cut can be made by the first saw 124 traversing across the first sliding table 108 in either lateral direction. In various embodiments, the first saw 124 may have a starting position at either lateral side of the first sliding table 108, such that the at least one first cut can be made in either lateral direction relative to the first sliding table.

In various embodiments, the first saw 124 may start on a first lateral edge of the first saw guide 140 and make the first cut traversing to the second lateral side of the first saw guide 140. In various embodiments, the first saw 124 may start on a second lateral edge of the first saw guide 140 and make the first cut traversing to the first lateral side of the first saw guide 140. In various embodiments, the first saw 124 may be adjustably coupled to the first saw guide 140 such that the first saw 124 can be adjusted in height, thereby varying the depth of cut into the ice sheet. In various embodiments, first saw 124 may include an adjustable hood or shield to compensate for the adjustment in height relative to the first saw guide 140. For example and without limitation, the adjustable shield may be lowered relative to the first saw guide 140 with the first saw 124, thereby protecting the non-cutting portions of the saw blade from exposure to possible user contact or components of the system 100. In various embodiments, as previously discussed above, the angle or pitch of the first saw 124 may be adjusted relative to the first saw guide 140 in order to make a non-normal cut into the ice sheet. In various embodiments, first saw 124 may be configured to couple to the first saw guide 140 at a plurality of predetermined angles, for example, between approximately 0 degrees to 180 degrees.

In various embodiments, first saw 124 may be configured to make any number of first cuts in the ice sheet. For example and without limitation, first saw 124 may make a plurality of cuts at lesser intervals of ice sheet advancement, thereby forming thinner ice rods. For example and without limitation, first saw 124 may make a plurality of cuts at greater intervals of ice sheet advancement, thereby forming wider ice rods or smaller ice sheets than the input ice sheet. The frequency of first cuts made by first saw 124 may be increased or decreased during operation, before cutting operation begins.

With continued reference to FIG. 19, method 1100 for cutting artisanal ice includes, at step 1120, contacting the pivot table with at least one ice rod. After cutting of the first cut into the ice sheet, forming the first ice rod, the downhill portion of the first sliding table 108 catches the falling ice rod and transports it to the pivot table 148. The cut ice rod, now separated from the main ice sheet, travels down the downhill portion of the first sliding table 108 and slides onto the pivot table 148. The ice rod may slide onto the pivot table in the same orientation in which it was cut form the ice sheet, transverse to the first direction, and aligning with the perpendicular second direction. The cut ice rod may be forced to the distal end of the pivot table 148, being stopped by one or more fixed supports, rails or walls extending across the distal end of the pivot table 148. In various embodiments, the ice rod may contact one or more aligning features on the pivot table that adjusts the lateral position of the ice rod on the pivot table 148.

Figure 11:
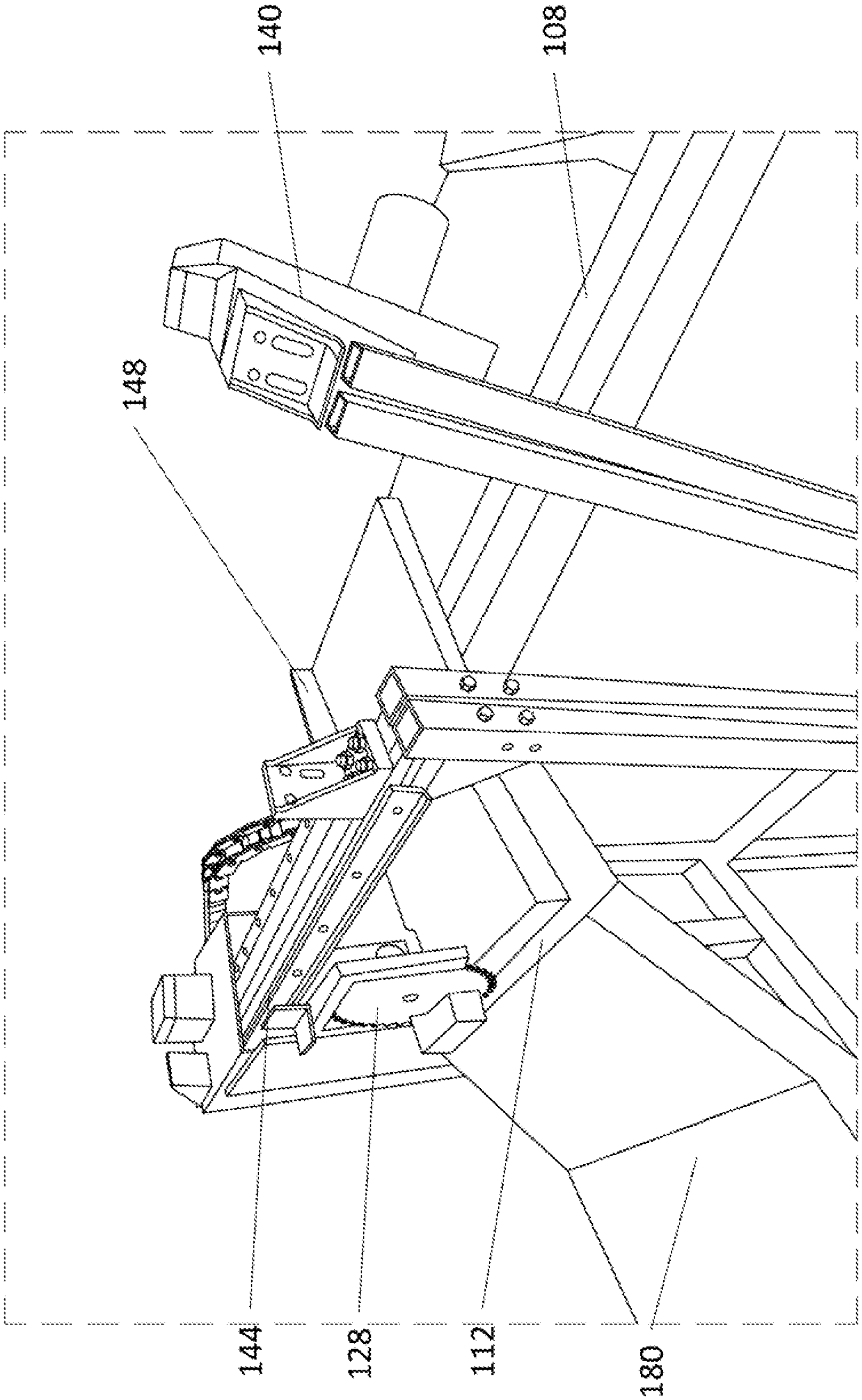
FIG. 11 is a perspective view of a pivot table and saws guides of a system for artisanal ice cutting in accordance with the disclosed subject matter.

In various embodiments, each successive ice rod formed from the first cuts of the first saw 124, slides down the downhill portion of the first sliding table 108 and abuts the previously cut ice rod, already disposed and aligned on the pivot table 148. Each successive cut ice rod may also contact any present aligning features and sit in a generally rectilinear against the plurality of ice rods as shown in FIG. 11. Each successive ice rod may be generally aligned on the pivot table 148 and/or constrained against the distal wall of the pivot table 148 in a parallel fashion to the plurality of ice rods and longitudinally aligned with the second direction as shown in FIG. 11. In various embodiments, a user may manually position the ice rods on the pivot table along the second direction.

With continued reference to FIG. 19, method 1100 for cutting artisanal ice includes, at step 1125, pivoting the pivot table 148 downward, thereby aligning the ice rods longitudinally with the second direction under the force of gravity forcing plurality of ice rods against the distal wall of the pivot table. Pivoting the pivot table 148 downwards may include pivoting the pivot table 148 about an axis aligned with the proximal end of the pivot table 148 proximate the second end of the first sliding table 108. The pivot table 148 may hinge about the proximate end of the pivot table 148 to form an angle planar surface extending down and away from the first sliding table 108, forcing the ice rods to slide down the pivot table 148 to the downward most point under the force of gravity.

In various embodiments, pivot table 148 may be actuated between its uppermost and lowermost positions by a pivot actuator 150 as described above. In various embodiments, the pivot actuator 150 may be rotatably coupled to the pivot table 148 and the subframe of the system 100 or floor. The pivot actuator 150 may raise and lower the distal end of the pivot table 148 by a piston extending and retracting into a cylinder. In various embodiments, the pivot table 148 may be pivotable higher than the coplanar position of the first and the second sliding tables, thereby forming an uphill slope and preventing ice rods from sliding over the pivot table. In various embodiments, the pivot table 148 may pivot over any angular range, such as between perpendicular to the planar surface downward and perpendicular to the planar surface upward, in a range of approximately 180 degrees. In various embodiments, pivot actuator 150 may be coupled to the underside of the pivot table 148 proximate the distal end of the pivot table and extend to the distal end of the pivot table. Upon retraction of the pivot actuator 150, the pivot table 148 hinges downward, and upon extension of the pivot actuator 150, the pivot table 148 hinges back upward.

In various embodiments, the planar surface of the pivot table 148 may be formed from a low friction surface such as coated or uncoated metal or metal alloys, such as aluminum or anodized aluminum. In various embodiments, the plurality of ice rods, when disposed on the pivoted downward pivot table 148 may be disposed lower than the plane of the first and second sliding table 108, 112, and out of the path of the second pushing arm 120. In various embodiments, during continuous operation, a first batch of ice rods may be pushed onto the second sliding table 112 by the second pushing arm 120 towards the second saw 128, simultaneously, a second batch of ice rods may be cut and pushed onto the pivot table 148, the pivot table 148 may be pivoted downward so that the second pushing arm 120 may retreat back to its starting position and pass over the downwardly pivoted pivot table 148 and the second batch of now-aligned ice rods. The pivot table 148 may then pivot upward to its coplanar position with the second sliding table 112, ready for the second pushing arm 120 to advance the second batch of ice rods along the second direction towards the second saw 128.

With continued reference to FIG. 19, method 1100 for cutting artisanal ice includes, at step 1130, advancing the at least one ice rod in the second direction along the second sliding table 112 towards second saw 128. Advancing the at least one ice rod, or plurality of ice rods, which are now longitudinally aligned with the second direction, may be pushed along the second sliding table 112 by the second pushing arm 120. Second pushing arm 120 may equally contact the short ends of the ice rods in order to advance the ice rods along a straight path and without separation. In various embodiments, advancing the ice rods in the second direction may include pushing the ice rods between fixes supports, such as between second fixed support 160 and one or more oppositely disposed rails or walls. In various embodiments, the ice rods may be aligned in the second direction, with the distal ends of the ice rods aligned against the second pushing arm 120, and the distal ends of the rods thereby constrained to advance simultaneously. The second pushing arm 120 may advance the ice rods to the cutting location underneath second saw 128 and second saw guide 144. Second saw 128 is disposed perpendicularly to the second direction and the advancement direction of the ice rods. Advancement of the ice rods along the second direction may be continuous or in discrete steps, as described above and in respect to the first pushing arm 116.

The discrete steps or distance the ice rods are advanced along the second sliding table 112 may be selected by the user via input to the control unit 104. The discrete step defines the distance between cuts of the ice rods and therefore the length of the ice blocks cut therefrom, as will be described in the next step. FIG. 11 depicts the second pushing arm 120 advancing the ice rods along second sliding table 112 towards the second saw 128 which is coupled to second saw guide 140.

Figure 7:
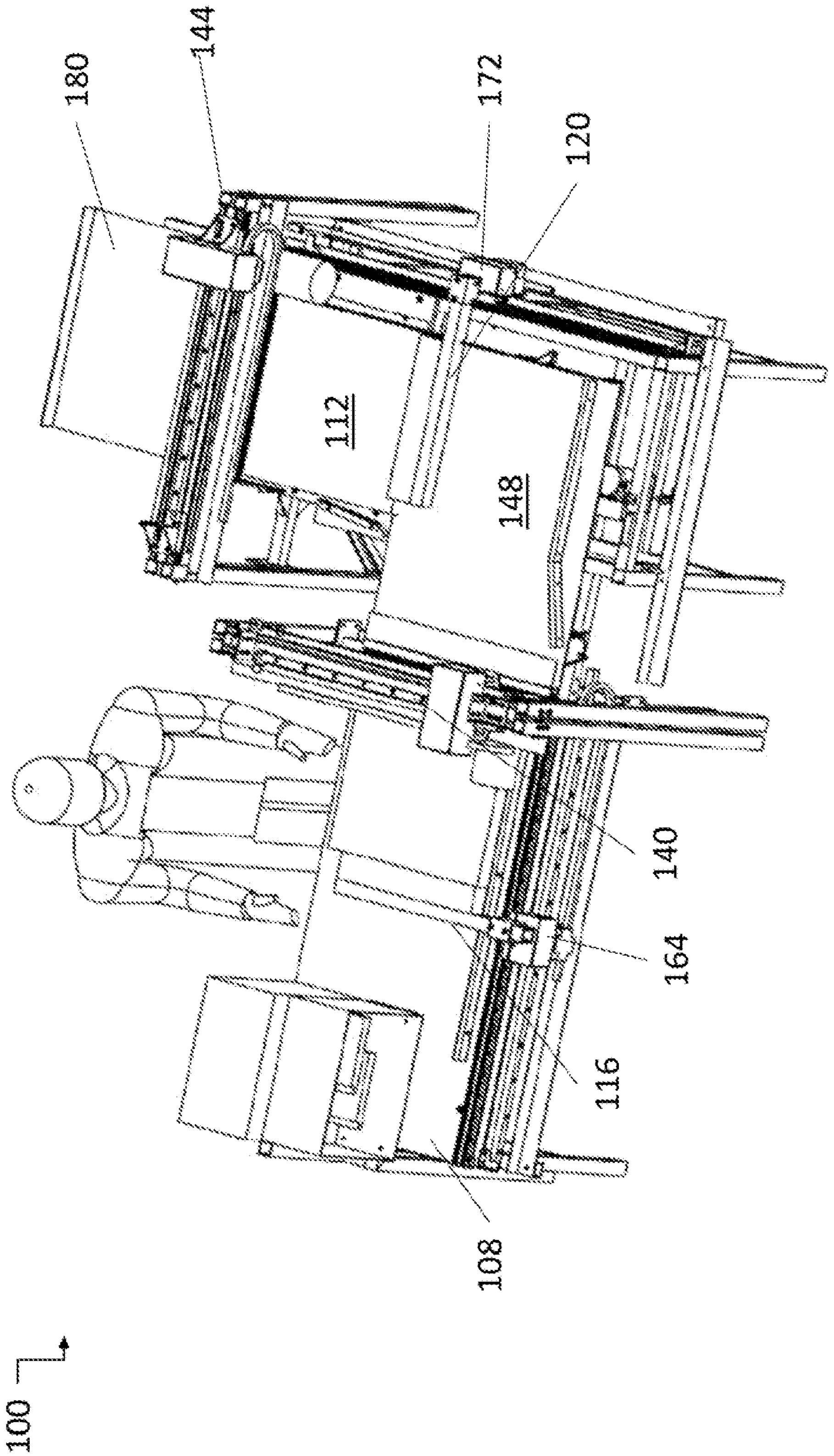

In various embodiments, the ice rods can advance any distance in the second direction along second sliding table 112 in order to make the second transverse cut in the ice rods at any desired point along the length of the ice rods. FIGS. 6-7 depicts the second pushing arm 120 advancing past the pivot table 148 and along the second sliding table 112. One of skill in the art would appreciate the depiction of the system 100 is illustrative, and any ice rods and any size ice sheet can be cut with the second saw 128. In various embodiments, even advancing the ice rods past the distal fourth end of the second sliding table and suspending over the end plate 180 in order to make a cut in the ice rods wherein the cut portion of the ice rod is longer than the longitudinal distance between the second saw 128 and the distal portion of the end plate 180.

With continued reference to FIG. 19, method 1100 for cutting artisanal ice, at step 1135, includes cutting at least one second cut transverse to the ice rods and the second direction. In various embodiments, the ice rods are cut by the second saw 128 as described above at a frequency that forms ice blocks. Each ice block cut from the ice rods may be generally cuboid, or rectangular prisms, among other shapes, defined by the initial ice sheet and cut lengths specified by the system or the user. Each ice block may be cut simultaneously across the plurality of ice rods by the second saw 128 making at least a first pass.

The at least one second cut can be made by the second saw 128 traversing across the second sliding table 112 in either lateral direction. In various embodiments, the second saw 128 may have a starting position at either lateral side of the second sliding table 112, such that the at least one second cut can be made in either lateral direction relative to the second sliding table 112. In various embodiments, the second saw 128 may start on a first lateral edge of the second saw guide 144 and make the first cut traversing to the second lateral side of second saw guide 144. In various embodiments, second saw 128 may start on a second lateral edge of the second saw guide 144 and make the first cut traversing to the first lateral side of the second saw guide 144. In various embodiments, the second saw 128 may be adjustably coupled to the second saw guide 144 such that the second saw 128 can be adjusted in height, thereby varying the depth of cut into plurality of the ice rods. In various embodiments, second saw 128 may include an adjustable hood or shield to compensate for the adjustment in height relative to second saw guide 144. For example and without limitation, the adjustable shield may be lowered relative to the second saw guide 144 with the second saw 128, thereby protecting the non-cutting portions of the saw blade from exposure to possible user contact or components of the system 100. In various embodiments, as previously discussed above, the angle or pitch of second saw 128 may be adjusted relative to the second saw guide 144 in order to make a non-normal cut into the ice rods. In various embodiments, second saw 128 may be configured to couple to second saw guide 144 at a plurality of predetermined angles, for example, between approximately 0 degrees to 180 degrees to the second sliding table 112.

In various embodiments, second saw 128 may be configured to make any number of second transverse cuts in the ice rods. For example and without limitation, second saw 128 may make a plurality of cuts at lesser intervals of ice rod advancement, thereby forming thinner ice blocks. For example and without limitation, second saw 128 may make a plurality of cuts at greater intervals of ice rod advancement, thereby forming wider ice blocks or smaller ice rods than the input ice rod. The frequency of second cuts made by second saw 128 may be increased or decreased during operation or before cutting operation begins. The advancement of the ice rods may be unique in each discrete step, such that subsequent ice blocks are of unique dimension from a single ice rod. In various embodiments, both first saw 124 and second saw 128 may make cuts simultaneously in the ice sheet and preceding ice rods, thereby forming a continuous process that does not requires finished ice blocks to be formed before loading of a next ice sheet on the first sliding table 108 as depicted in FIGS. 7 and 11.

With continued reference to FIG. 19, method 1100 for cutting artisanal ice includes, at step 1140, advancing the ice blocks in the second direction after cutting from the ice rods. In various embodiments, second sliding table 112 may include a downwardly sloped or downhill portion disposed proximate the fourth end and underneath the second saw 128. The downwardly sloped portion may be configured to eject or locomote the cut ice blocks from the ice rods to an endplate 180. The downwardly sloped portion may be disposed underneath the second saw guide 144 such that after cutting of the ice blocks from the ice rods by the second saw 128, the ice blocks are separated from the ice rods, transported by gravity down the slope to the endplate 180 for collection by a user or deposition into a receptacle.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A system for cutting artisanal ice, the system comprising:

- a first sliding table having a first end and a second end, defining a first direction therebetween;
- a first saw guide disposed above the first sliding table and oriented perpendicular to the first direction;
- a first saw translatably coupled to the first saw guide, the first saw configured to translate horizontally along the first saw guide and laterally across the first sliding table;
- a first pushing arm extending laterally across the first sliding table, the first pushing arm configured to translate along the first direction from the first end of the first sliding table to the second end of the first sliding table;
- a pivot table pivotably coupled to the second end of the first sliding table, the pivot table configured to pivot between a first position with respect to the first sliding table, to a second position;
- a second sliding table having a third end and a fourth end, defining a second direction therebetween, the third end disposed adjacent to the pivot table, wherein the second direction is perpendicular to the first direction;
- a second pushing arm extending across the pivot table in the first direction, the second pushing arm configured to translate along the second direction;
- a second saw guide disposed above the second sliding table and oriented perpendicular to the second direction; and
- a second saw translatably coupled to the second saw guide, the second saw configured to translate along the second saw guide.

2. The system for cutting artisanal ice of claim 1, wherein at least one of the first saw and the second saw are circular saws.

3. The system for cutting artisanal ice of claim 1, wherein the pivot table is configured to pivot about an axis extending in the second direction and disposed proximate the second end of the first sliding table.

4. The system for cutting artisanal ice of claim 1, wherein at least a portion of the pivot table is coplanar with the first table when the pivot table is in the first position, and at least a portion of the pivot table is not coplanar with the first table when the pivot table is in the second position.

5. The system for cutting artisanal ice of claim 4, wherein each of the first and the second saw guide comprise a first actuator and a second actuator, the first actuator configured to rotate at least one of the first and the second saw, and the second actuator configured to translate at least one of the first and the second saw along the first and the second saw guides, respectively.

6. The system for cutting artisanal ice of claim 4, wherein at least one of the first and the second actuators is an electric motor.

7. The system for cutting artisanal ice of claim 1, wherein each of the first pushing arm and the second pushing arm comprise a pushing arm actuator.

8. The system for cutting artisanal ice of claim 1, wherein each of the first and the second sliding tables comprise downward sloped portions configured to locomote cut ice, disposed below the first and the second saw guides, respectively.

9. The system for cutting artisanal ice of claim 1, further comprising an end plate disposed proximate the fourth end of the second sliding table.

10. The system for cutting artisanal ice of claim 1, further comprising a first fixed support wall extending from the first end to the second end along a lateral edge of the first sliding table and a second fixed support wall extending from the third end to the fourth end along a lateral edge of the second sliding table.

11. The system for cutting artisanal ice of claim 1, further comprising:

- a first arm guide disposed along a lateral edge of the first sliding table; and
- a first arm control motor affixed to the first arm guide to move the first pushing arm along the first direction from the first end of the first sliding table to the second end of the first sliding table.

12. A method for cutting artisanal ice, the method comprising:

- providing a rectilinear ice sheet on a first sliding table, the first sliding table oriented along a first direction;
- advancing the at least one ice sheet in the first direction towards a pivot table;
- cutting at least one first cut entirely through the ice sheet by translating horizontally a first saw laterally across the ice sheet to form at least one ice rod;
- contacting the pivot table with the at least one ice rod;
- pivoting the pivot table downward with the at least one ice rod disposed thereon;
- pivoting the pivot table upward to align at least a portion of the pivot table with a second sliding table;
- advancing the at least one ice rod in a second direction along the second sliding table, the second direction disposed perpendicularly to the first direction;
- cutting at least one transverse cut into the at least one ice rod by translating horizontally a second saw laterally across the ice sheet to form at least one ice block; and
- advancing the ice block(s) in the second direction towards an endplate.

13. The method for cutting artisanal ice of claim 12, wherein the first and the second sliding tables each have at least partially wooden sliding surfaces.

14. The method for cutting artisanal ice of claim 12, wherein cutting the at least one first cut and the at least one transverse cut comprises ejecting cuttings transverse to the first sliding table and the second sliding table, respectively.

15. The method for cutting artisanal ice of claim 14, wherein ejecting the cuttings comprises ejecting the cuttings to a common point exterior to the first and the second sliding table.

16. The method for cutting artisanal ice of claim 12, wherein cutting the at least one first cut comprises cutting a plurality of parallel first cuts transverse to the first direction in the ice sheet to form a plurality of parallel ice rods.

17. The method for cutting artisanal ice of claim 16, wherein advancing the at least one ice rod in the second direction comprises advancing the plurality of ice rods in the second direction.

18. The method for cutting artisanal ice of claim 16, wherein pivoting the pivot table downward comprises aligning the plurality of parallel ice rods with one another.

19. The method for cutting artisanal ice of claim 16, wherein cutting the plurality of parallel first cuts comprises cutting the plurality of first cuts by advancing a first saw across the ice sheet periodically as the ice sheet advances in the first direction.

20. The method for cutting artisanal ice of claim 12, wherein cutting the at least one transverse cut comprises cutting a plurality of parallel transverse cuts, thereby forming a plurality of ice blocks.

21. The method for cutting artisanal ice of claim 20, wherein cutting the plurality of parallel transverse cuts comprises cutting the plurality of parallel transverse cuts by advancing a second saw across the plurality of ice rods periodically as the plurality of ice rods advances in the second direction.

* * * * *